(12) United States Patent
Suzuki et al.

(10) Patent No.: US 7,433,619 B2
(45) Date of Patent: Oct. 7, 2008

(54) HEAT FIXING DEVICE CAPABLE OF PREVENTING DETERIORATION OF A TEMPERATURE SENSOR AND AN IMAGE FORMING APPARATUS

(75) Inventors: Masashi Suzuki, Nagoya (JP); Tomoaki Hattori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 207 days.

(21) Appl. No.: 10/843,631

(22) Filed: May 12, 2004

(65) Prior Publication Data
US 2005/0053390 A1 Mar. 10, 2005

Related U.S. Application Data

(63) Continuation-in-part of application No. PCT/JP02/11845, filed on Nov. 13, 2002.

(30) Foreign Application Priority Data

Nov. 13, 2001 (JP) ............... 2001-347795
Mar. 25, 2002 (JP) ............... 2002-083101
Mar. 27, 2002 (JP) ............... 2002-088729

(51) Int. Cl.
*G03G 15/20* (2006.01)
(52) U.S. Cl. ...................... 399/69; 399/328
(58) Field of Classification Search .......... 399/69, 399/328; 219/216
See application file for complete search history.

(56) References Cited

U.S. PATENT DOCUMENTS

| | | | |
|---|---|---|---|
| 4,791,299 A | 12/1988 | Naito et al. | |
| 5,697,016 A * | 12/1997 | Kitsu et al. | 399/69 |
| 5,974,294 A * | 10/1999 | Tange | 399/328 |
| 6,367,972 B1 | 4/2002 | Kamiyama et al. | |
| 6,407,389 B1 | 6/2002 | Nishii et al. | |
| 6,684,037 B2 * | 1/2004 | Tamaoki | 399/69 |
| 6,751,436 B2 * | 6/2004 | Bhatti et al. | 399/341 |

FOREIGN PATENT DOCUMENTS

| | | |
|---|---|---|
| JP | U 48-111186 | 12/1973 |
| JP | A-53-025444 | 9/1978 |
| JP | A 58-172671 | 10/1983 |
| JP | A-62-203071 | 9/1987 |
| JP | A 4-353728 | 12/1992 |
| JP | A-5-256704 | 10/1993 |
| JP | A-6-118837 | 4/1994 |
| JP | A 7-77891 | 3/1995 |
| JP | A 7-301566 | 11/1995 |
| JP | A-8-35884 | 2/1996 |
| JP | A 8-145798 | 6/1996 |
| JP | A-08-254466 | 10/1996 |
| JP | 09106210 A * | 4/1997 |
| JP | 09164593 A * | 6/1997 |

(Continued)

*Primary Examiner*—Quana M Grainger
(74) *Attorney, Agent, or Firm*—Oliff & Berridge, PLC

(57) ABSTRACT

A heat fixing device capable of preventing deterioration of a temperature sensor by measuring the surface temperature of a heating roller at all times, and an image forming apparatus. The heat fixing device includes a temperature measurement unit for measuring the surface temperature of the heating roller. The temperature measurement unit further includes the temperature sensor, a conduit having a reflective surface formed inside thereof to lead infrared rays radiating from the heating roller to the temperature sensor, and a thermal insulation member installed between the conduit and the temperature sensor.

41 Claims, 15 Drawing Sheets

FOREIGN PATENT DOCUMENTS

| | | |
|---|---|---|
| JP | 11223555 A * | 8/1999 |
| JP | A-11-223555 | 8/1999 |
| JP | A 2000-139849 | 5/2000 |
| JP | A 2000-330408 | 11/2000 |
| JP | A 2000-346710 | 12/2000 |
| JP | A-2001-34109 | 2/2001 |
| JP | A-2001-228742 | 8/2001 |
| JP | A 2001-228742 | 8/2001 |
| JP | A 2002-350234 | 12/2002 |
| JP | A-2002-350234 | 12/2002 |
| JP | 2003149986 A * | 5/2003 |
| JP | A-2005-157542 | 6/2005 |

* cited by examiner

HEAT FIXING DEVICE CAPABLE OF PREVENTING DETERIORATION OF A TEMPERATURE SENSOR AND AN IMAGE FORMING APPARATUS

CROSS-REFERENCE RELATED APPLICATION

This application is a continuation-in-part application of PCT/JP02/11845 of an international application designating the United States of America filed on Nov. 13, 2002 (international filing date).

BACKGROUND OF THE INVENTION

1. Field of the Invention

The present invention relates to a heat fixing device and an image forming apparatus provided with the heat fixing device.

2. Description of Related Art

An image forming apparatus such as a laser printer is usually provided with a heat fixing device having a heating roller and a press roller for heating and fixing a toner image that has been transferred onto paper. In the heat fixing device, the toner image transferred onto the paper is heated and fixed as the paper passes between the heating roller and the press roller.

The heating roller of such a heat fixing device usually has a heater such as a halogen lamp incorporated therein and a temperature sensor provided for sensing the temperature of the surface of the heating roller. In the heating roller, the turning on and off of the heater is controlled by sensing the surface temperature by a temperature sensor, to maintain a predetermined heat fixing temperature.

Two known types of temperature sensor are used in a heat fixing device: a contact type of temperature sensor such as a thermistor that is in contact with the heating roller, and a non-contact type of temperature sensor such as an infrared sensor that is not in contact with the heating roller. The contact type of temperature sensor, however, may raise problems in that the sensing accuracy thereof may deteriorate if toner adheres to the temperature sensor, and that the toner adhering to the temperature sensor may peel off to damage the heating roller or fall onto the paper to dirty it. In contrast thereto, since a non-contact type of temperature sensor does not come into contact with the surface of the heating roller, it is unlikely to damage the surface of the heating roller over time. Thus, there have been various proposals for a heat fixing device provided with such a non-contact type of infrared sensor.

A thermopile type of temperature sensor is a typical non-contact type of temperature sensor. The thermopile type of temperature sensor is provided with a thermopile element. When the thermopile element receives infrared rays, the thermopile element outputs an electrical signal having a voltage level that corresponds to the radiation intensity of the received infrared rays. In general, a heat-generating substance such as a heating roller radiates infrared rays with a radiation intensity that corresponds to the surface temperature thereof. For that reason, the thermopile type of temperature sensor can be used to detect the surface temperature of the heating roller, if it receives the infrared rays radiating from the heating roller.

However, since an infrared sensor generally has a low thermal resistance, it is difficult to dispose the infrared sensor in the vicinity of a heating roller that is maintained at a high heat fixing temperature. It is therefore necessary to dispose the infrared sensor and the heating roller with a predetermined spacing therebetween. If the spacing is too far, the infrared sensor will sense the temperature of portions other than the surface of the heating roller, which may lead to errors in the sensing of the surface temperature of the heating roller.

In Japanese unexamined patent application publication No. 7-77891, it is proposed to dispose the heating roller and the infrared sensor at a predetermined spacing apart, and interpose a cylindrical member between the heating roller and the infrared sensor in order to limit the viewing angle.

However, if a cylindrical member is interposed between the heating roller and the infrared sensor, the infrared rays radiating from the heating roller attenuates as they pass through the cylindrical member. The viewing angle of the infrared sensor is determined by the diameter of the cylindrical member and the distance from the infrared sensor to the leading end of the cylindrical member. Accordingly, if the spacing between the infrared sensor and the heating roller is made larger, the viewing angle will be narrowed by a corresponding amount. This is inconvenient in that the radiation intensity of infrared rays sensed by the infrared sensor is not so sufficient as to achieve accurate temperature sensing.

In addition, when a non-contact type of temperature sensor described above is used, the heat generated by the heating sensor will transfer the non-contact type of temperature sensor through the conduit, so that the temperature of the non-contact type of temperature sensor will gradually rise. In such a case, since the non-contact type of temperature sensor usually has a lower thermal resistance, the usage of the non-contact type of temperature sensor may raise problems in that the temperature sensing accuracy may fall and the non-contact type of temperature sensor may deteriorate.

Furthermore, if the attachment position of the non-contact type of temperature sensor with respect to the heating roller is displaced, the quantity of infrared rays arriving at the non-contact type of temperature sensor will change, raising a problem in that the temperature sensing accuracy will fall.

SUMMARY OF THE INVENTION

The present invention has been devised in the light of the above problems. An object of the present invention is to provide a heat fixing device and an image forming apparatus provided therewith that achieves accurate temperature sensing while maintaining the distance between the heating member and the temperature sensing means, preventing attenuation of infrared rays radiating from the heating member and improving the durability of the temperature sensor.

To achieve the above objective, the present invention is characterized by a heat fixing device provided with temperature sensing means that measures a temperature of a surface of fixing means. The heat fixing device includes ray-guiding means provided between the surface and the temperature sensing means that guides infrared rays radiating from the surface to the temperature sensing means. The temperature sensing means includes an infrared sensor that senses the temperature of the surface without being in contact with the surface; an inner surface of the ray-guiding means is formed from a reflective surface that reflects infrared rays.

This configuration ensures that the infrared rays radiating from the surface of the fixing means are reflected by the reflective surface within the conduit and guided to the temperature sensing means to be sensed by the temperature sensing means. Because the fixing means and the temperature sensing means are disposed at a predetermined spacing apart, it is possible to improve the durability of the temperature sensing means. In addition, since the infrared rays radiating from the surface of the fixing means are guided to the temperature sensing means by the conduit, the temperature sensing means is prevented from sensing the temperature of portions other than that surface, thereby reducing sensing errors. Moreover, the infrared rays radiating from the surface of the fixing means impinge onto the conduit through the aperture portion of the conduit facing the fixing means as a function of the internal dimensions of the aperture portion. The thus-impinging infrared rays can then reach to the temperature sensing means without being greatly attenuated. The temperature sensing means can receive substantially the same quantity of infrared rays as those impinging onto the aperture portion of the conduit, even though the conduit is interposed between the temperature sensing means and the fixing means. Therefore, the viewing angle is not narrowed by the conduit so that the temperature sensing means can sense a sufficient amount of infrared rays that are radiated from the surface of the fixing means with the original viewing angle, thereby achieving accurate temperature sensing.

In the heat fixing device, the reflective surface is preferably formed from a metal.

If the reflective surface is formed from a metal, it is possible to form a reflective surface that reflects the infrared rays radiating from the surface of the fixing means with a high level of reflectivity with high accurate and good workability. It is therefore possible to achieve accurate temperature sensing in a simple manner.

The reflective surface of the heat fixing device is preferably formed from gold.

The reflective surface is formed from gold, the infrared rays radiating from the surface of the fixing means are reflected by a reflectivity of about 98%, guided to the temperature sensing means without being substantially attenuated. It is therefore possible to reliably achieve an accurate temperature sensing.

A whole of the conduit of the heat fixing device is preferably formed from a metal.

Such a configuration can make the reflective surface inside of the conduit. It is possible to form a conduit having a reflective surface that reflects infrared rays with a high reflectivity, both simply and reliably.

Alternatively, a main body of the conduit is preferably formed of a resin, with the reflective surface being formed of a metal.

In the above configuration, since the main body of the conduit is formed of a resin that has a thermal conductivity lower than that of metal, transmission of heat to the temperature sensing means from the surface of the fixing means is reduced. Since it is therefore possible to further prevent damage to the temperature sensing means by heat, while preventing attenuation of the infrared rays and achieving accurate temperature sensing, thereby improving the durability of the temperature sensing means.

The temperature sensing means of the heat fixing device is preferably a thermopile type of infrared sensor.

Most of infrared sensors are often used to sense changes in a temperature of an object to be measured. Therefore, the infrared sensors often lose their detecting ability when the temperature of the object to be measured dose not change. As a result, the infrared sensor cannot sense the actual temperature of the object to be measured continuously. For that reason, to sense the actual temperature of the object to be measured continuously, it is necessary to provide a shutter for passing the infrared rays intermittently, which makes the device configuration complicated.

The thermopile type of infrared sensor, however, can sense the temperature of the object to be measured continuously, even if there are no changes in the temperature. If such a thermopile type of infrared sensor is used as the temperature sensing means, it is possible to sense the temperature of the surface of the fixing means continuously with a simple configuration, thereby achieving high accurate temperature sensing.

The fixing means of the heat fixing device is preferably a roller. If the fixing means is a roller, it is possible to ensure heat of the fixing medium while being transported, thereby achieving satisfactory heat fixing.

In the heat fixing device, the roller, the ray-guiding means, and the temperature sensing means are positioned so as to satisfy the following equation (1):

$$0 < d \leq r\{(1/\sin\theta)-1\} - r'/\tan\theta \qquad (1)$$

wherein the diameter of the roller is set as 2r, an internal length of an aperture portion of the ray-guiding means in a direction orthogonal to both the axial direction of the roller and a longitudinal direction of the ray-guiding means is set as 2r', a gap between the surface and the ray-guiding means is set as d, and a viewing angle of the temperature sensing means is set as θ.

Such a configuration prevents the temperature sensing means from sensing the temperature of portions other than the surface of the fixing means, more reliably, while maintaining a predetermined spacing between the surface of the fixing means and the conduit. It is therefore possible to design the optimal dispositions for the various components, thereby achieving more accurate temperature sensing.

In the heat fixing device, a gap of at least 20 mm separates the surface from the conduit.

Since a gap of at least 20 mm is provided between the surface of the fixing means and the conduit, it is possible to efficiently restrain the transfer of heat from the surface of the fixing means to the conduit, even when the entire conduit is formed from a metal with a high thermal conductivity. It is therefore possible to prevent damage to the temperature sensing means due to heat generated from a conduit formed of metal, thereby improving the durability of the temperature sensing means.

The heat fixing device is preferably disposed so that there is a gap of at least 20 mm between the surface of the heat fixing device and the temperature sensing means.

The above configuration enables the main body of the conduit to be formed from a resin of a lower thermal conductivity. And a gap of at least 20 mm is provided between the surface of the fixing means and the temperature sensing means. It is possible to efficiently prevent the transfer of heat from the surface of the fixing means through the conduit. It is possible to prevent damage to the temperature sensing means due to heat from the conduit, thereby improving the durability of the temperature sensing means.

The heat fixing device of the present invention further includes a contacting member in contact with the fixing means. The temperature sensing means is disposed in such a manner as not to overlap the contacting member in a direction orthogonal to the direction in which a fixing medium is fed.

The fixing means can be provided with a contacting member that is in contact with the surface of the fixing means, such as a removal claw for scraping the fixing medium that has been fixed by heat fixing off the heating member or the pressure member.

In such a case, the portion in contact with the contacting member is likely to become damaged during long-term usage. If the portion is damaged, the medium to be fixed (such as the developer) may penetrate the damaged portions, leading to problems in that the emissivity of infrared rays at that portion will change.

According to the above configuration, the temperature sensing means can be placed not to overlap the contacting member in the direction orthogonal to the direction in which the fixing medium is fed. Even if a portion of the surface of the fixing means in contact with the contacting member is damaged due to a long time usage and the medium to be fixed such as a developer penetrates into the portion, the temperature sensing means does not sense the surface of that portion, so that it is possible to efficiently prevent sensing-errors due to the damaged contacting member.

Preferably, the fixing means of the heat fixing device includes a heating member to be heated and a press member that presses the heating member. The temperature sensing means senses the temperature of the surface of the heating member.

According to the above configuration, it is possible to heat and press a fixing medium while the fixing medium being fed between the pressure member and the heating member. Moreover, since the temperature sensing means senses the temperature of the surface of the heating member, the surface can be maintained reliably at a fixing temperature, thereby achieving satisfactory thermal fixing.

The surface roughness of the reflective surface in the heat fixing device is preferably less than or equal to the wavelength sensed by the temperature sensing means.

If the surface roughness of the reflective surface is formed to be smaller than the wavelength of infrared rays sensed by the temperature sensing means, it is possible to guide the infrared rays radiating from the surface of the fixing means to the temperature sensing means, without being obstructed by the reflective surface. It is possible to reliably achieve more accurate temperature sensing.

The reflective surface of the heat fixing device preferably has a mirrored surface.

If the reflective surface is formed as a mirrored surface, it is possible to guide the infrared rays radiating from the surface of the fixing means satisfyingly to the temperature sensing means without being impeded by the reflective surface. It is possible to reliably achieve more accurate temperature sensing.

An image forming apparatus in accordance with the present invention is preferably provided with the above-described heat fixing device.

Since the thus-configured image forming apparatus is provided with the heat fixing device that is designed to improve the durability of the temperature sensing means, and is also capable of achieving accurate temperature sensing, the image forming apparatus can achieve favorable image formation over a long period of time.

The present invention is characterized by a heat fixing device including fixing means that heats and fixes a medium to be fixed onto a fixing medium; accommodation means that accommodates the fixing means; temperature sensing means that measures a surface temperature of the fixing means based on infrared rays radiating from the surface of the fixing means; and ray-guiding means that guides the infrared rays radiating from the fixing means to the temperature sensing means. The temperature sensing means is disposed outside the accommodation means. The ray-guiding means includes a hollow portion that is a path for infrared rays and a reflective surface provided facing the hollow portion in order to reflect the infrared rays. In this case, printing paper or an object to be laminated can be the fixing medium. A developer or film can be the medium to be fixed, by way of example.

Since the temperature sensing means of the heat fixing device of the present invention is disposed outside the accommodation means, Any rise in the temperature of the temperature sensing means due to the heat emitted by the fixing means can be prevented, even if the temperature within the accommodation means does rise.

The temperature sensing means can measure the temperature of the fixing means accurately. In addition, deterioration of the temperature sensing means can be suppressed.

The heat fixing device in accordance with the present invention is also provided with ray-guiding means having a hollow portion and a reflective surface, such that infrared rays radiating from the surface of the fixing means are reflected by the reflective surface and guided to the temperature sensing means through the hollow portion. It is possible to guide sufficient amount of infrared rays radiating from the surface of the fixing means to the temperature sensing means for accurate temperature sensing, even if the temperature sensing means is separated from the fixing means.

In addition, since the heat fixing device in accordance with the present invention is provided with the ray-guiding means, it is possible to guide the infrared rays radiated by the fixing means to the temperature sensing means, thereby improving measurement accuracy of the temperature sensing means.

The heat fixing device is also preferably provided with a high thermal conductivity resistance portion that interrupts thermal conduction of heat generated by the fixing means along a thermal conduction path to the temperature sensing means through the ray-guiding means.

Since the thermal conduction path in the heat fixing device in accordance with the present invention is provided with the high thermal conductivity resistance portion, thermal conduction to the temperature sensing means is suppressed.

Accordingly, any rise in the temperature of the temperature sensing means can be prevented, so that the temperature sensing means can measure the temperature of the surface of the fixing means more accurately. In addition, deterioration of the temperature sensing means can be suppressed even further.

The present invention is characterized by a heat fixing device including: fixing means that heats and fixed a medium to be fixed onto a fixing medium; temperature sensing means that measures a surface temperature of the fixing means based on infrared rays radiating from a surface of the fixing means; ray-guiding means that guides infrared rays radiating from the fixing means to the temperature sensing means; and a high thermal conductivity resistance portion that interrupts thermal conduction of heat generated by the fixing means along a thermal conduction path to the temperature sensing means through the ray-guiding means. In this case, printing paper or an object to be laminated can be the fixing medium and a developer or film can be the medium to be fixed.

Since the thermal conduction path in the heat fixing device in accordance with the present invention is provided with the high thermal conductivity resistance portion, thermal conduction from the fixing means to the temperature sensing means is suppressed.

According to the above structure, a rise in the temperature of the temperature sensing means can be prevented so that the temperature sensing means can measure the temperature of the surface of the fixing means accurately. In addition, deterioration of the temperature sensing means can be suppressed.

The heat fixing device is preferably provided with accommodation means for accommodating the fixing means.

In the present invention, the fixing means is accommodated in the accommodation means. The temperature sensing means can be attached to the accommodation means.

In the heat fixing device, the high thermal conductivity resistance portion is preferably formed from a thermal insulating material.

In the present invention, by providing a high thermal conductivity resistance portion formed of the thermal insulating material in the thermal conduction path, thermal conduction to the temperature sensing means can be prevented so that a rise in the temperature of the temperature sensing means can be prevented. The temperature sensing means therefore can measure the temperature of the fixing means accurately. Deterioration of the temperature sensing means can be suppressed.

The thermal insulating material of the heat fixing device preferably has a thermal conductivity of 10 W/mK or less.

In the present invention, the thermal conductivity of the thermal insulating material is 10 W/mK or less, so that it is possible to suppress thermal conduction along the thermal conduction path and suppress any rise in the temperature of the temperature sensing means. The temperature sensing means can therefore measure the temperature of the fixing means with high accuracy, and deterioration of the temperature sensing means can be suppressed.

The thermal insulating material of the heat fixing device preferably includes a heat-resistant resin.

In the present invention, by providing a thermal insulation member formed of a heat-resistant resin as a high thermal conductivity resistance portion in the thermal conduction path, thermal conduction to the temperature sensing means can be suppressed. And it is possible to suppress any rise in the temperature of the temperature sensing means. This arrangement enables the temperature sensing means to measure the temperature of the fixing means with high accuracy, and also ensures that deterioration of the temperature sensing means can be suppressed.

The portion formed of the thermal insulating material in the heat fixing device preferably has a length of at least 0.1 mm along the thermal conduction path.

In the present invention, the length of the portion formed of the thermal insulation material is at least 0.1 mm along the thermal conduction path, so that thermal conduction along the thermal conduction path can be prevented and a rise in temperature of the temperature sensing means can be suppressed. This arrangement enables the temperature sensing means to measure the temperature of the fixing means with high accuracy, and also ensures that deterioration of the temperature sensing means can be suppressed.

The high thermal conductivity resistance portion of the heat fixing device is preferably separated by air in the thermal conduction path.

The high thermal conductivity resistance portion is provided in the present invention. By providing a portion separated by air having a lower thermal conductivity as the high thermal conductivity resistance portion in the thermal conduction path, thermal conduction to the temperature sensing means can be suppressed. And it is possible to suppress any rise in the temperature of the temperature sensing means. This arrangement enables the temperature sensing means to measure the temperature of the fixing means with high accuracy, and also ensures that deterioration of the temperature sensing means can be suppressed.

The portion of the heat fixing device separated by the air is preferably at least 0.1 mm in length along the thermal conduction path.

Since the length of the portion separated by air is at least 0.1 mm along the thermal conduction path, thermal conduction along the thermal conduction path can be prevented and any rise in the temperature of the temperature sensing means can be suppressed. This arrangement enables the temperature sensing means to measure the temperature of the fixing means with high accuracy, and also ensures that deterioration of the temperature sensing means can be suppressed even further.

The high thermal conductivity resistance portion has a sectional area of a surface perpendicular to a thermal conduction direction that is smaller than a sectional area of vicinity of the surface in the thermal conduction path.

In the present invention, since a portion with a smaller sectional area perpendicular to the direction of thermal conduction is interposed in the thermal conduction path, thermal conduction is suppressed.

In the present invention, by providing the above-described portion as the high thermal conductivity resistance portion, thermal conduction to the temperature sensing means can be suppressed, and it is possible to suppress any rise in the temperature of the temperature sensing means. This arrangement enables the temperature sensing means to measure the temperature of the fixing means with high accuracy, and also ensures that deterioration of the temperature sensing means can be suppressed.

The high thermal conductivity resistance portion of the heat fixing device is preferably provided between the ray-guiding means and the temperature sensing means.

In the present invention, by providing the high thermal conductivity resistance portion between the ray-guiding means and the temperature sensing means, thermal conduction from ray-guiding means to the temperature sensing means can be suppressed, and it is possible to suppress any rise in the temperature of the temperature sensing means. This arrangement enables the temperature sensing means to measure the temperature of the fixing means with high accuracy, and also ensures that deterioration of the temperature sensing means can be suppressed.

The high thermal conductivity resistance portion of the heat fixing device is preferably provided in the ray-guiding means.

In the present invention, by providing the high thermal conductivity resistance portion in the ray-guiding means, thermal conduction from the fixing means through the ray-guiding means to the temperature sensing means can be suppressed, and it is possible to suppress any rise in the temperature of the temperature sensing means. This arrangement enables the temperature sensing means to measure the temperature of the fixing means with high accuracy, and also ensures that deterioration of the temperature sensing means can be suppressed.

The high thermal conductivity resistance portion of the heat fixing device is preferably formed by forming the main body of the ray-guiding means from a thermal insulating material.

In the present invention, by forming the main body of the ray-guiding means from the thermal insulating material, thermal conduction from the fixing means through the ray-guiding means to the temperature sensing means can be suppressed. This arrangement enables the temperature sensing means to measure the temperature of the fixing means with high accuracy, and also ensures that deterioration of the temperature sensing means can be suppressed.

The high thermal conductivity resistance portion of the heat fixing device is preferably provided in a casing of the temperature sensing means.

In the present invention, the position of the high thermal conductivity resistance portion is indicated as an example. By providing the high thermal conductivity resistance portion in the casing of the temperature sensing means, thermal conduction to the temperature sensing means housed in the casing is suppressed, even if the ray-guiding means or the surroundings of the casing are at a higher temperature, so that it is possible to suppress any rise in the temperature of the temperature sensing means. This arrangement enables the temperature sensing means to measure the temperature of the fixing means with high accuracy, and also ensures that deterioration of the temperature sensing means can be suppressed.

The casing provided with the high thermal conductivity resistance portion can be formed mainly from a material of a lower thermal conductivity (such as a heat-resistant resin). Alternatively, the casing can have portions formed of a material of a lower thermal conductivity, which is in contact with the ray-guiding means.

The heat fixing device is preferably further provided with a radiation means for removing heat from the ray-guiding means and/or the temperature sensing means.

In the present invention, by providing the heat fixing device with radiation means, it is possible to efficiently remove heat that has been transferred to the ray-guiding means, the temperature sensing means, or both of them. It is therefore possible to suppress any rise in the temperature of the temperature sensing means, thus enabling highly accurate measurement of the temperature of the fixing means. In addition, deterioration of the temperature sensing means can be suppressed.

The radiation means is preferably in contact with the ray-guiding means and/or the temperature sensing means, the radiation means is provided with radiation fins.

The radiation means of the present invention is provided with radiation fins, so that it is possible to efficiently dissipate heat that has been transferred to the ray-guiding means, the temperature sensing means, or both of them. Thus, the radiation means of the present invention has effect of removing heat from the temperature sensing means or the ray-guiding means.

As a result, according to the present invention, it is possible to suppress any rise in temperature of the temperature sensing means, so that it is possible to measure the temperature of the fixing means with high accuracy. In addition, deterioration of the temperature sensing means can be suppressed.

The radiation means of the heat fixing device is in contact with the ray-guiding means and/or the temperature sensing means. And the radiation means is in contact with another member which is at a lower temperature than that of the ray-guiding means and/or the temperature sensing means.

Since the radiation means in accordance with the present invention is in contact with the ray-guiding means, the temperature sensing means, or both of them, and in contact with another member at a lower temperature, the radiation means exhibits the effect of removing heat from the ray-guiding means, the temperature sensing means, or both. This arrangement ensures suppressing any rise in temperature of the temperature sensing means, so that it is possible to measure the temperature of the fixing means with high accuracy. In addition, deterioration of the temperature sensing means can be suppressed.

The ray-guiding means of the heat fixing device is preferably fixed to a support member that supports the fixing means.

In the present invention, the ray-guiding means is fixed to the support member that supports the fixing means, so that the positional relationship of the ray-guiding means and the fixing means is always kept constant. For that reason, the temperature sensing means in each heat fixing device can always sense infrared rays radiating from a predetermined region with respect to the surface of the fixing means.

As a result, the temperature sensing means can always measure the temperature of the surface of the fixing means accurately, regardless of a type of heat fixing device.

The ray-guiding means of the heat fixing device is preferably positioned with reference to a support member that supports the fixing means.

In the present invention, the ray-guiding means is positioned with reference to the support member that supports the fixing means, so that the positional relationship of the ray-guiding means and the fixing means is always kept constant. For that reason, the temperature sensing means can always sense infrared rays radiating from a predetermined region with respect to the surface of the fixing means.

As a result, the temperature sensing means can always measure the temperature of the surface of the fixing means accurately regardless of a type of heat fixing device.

The temperature sensing means of the heat fixing device is preferably separable from the ray-guiding means.

in the present invention, the temperature sensing means can be separable from the ray-guiding means, so that it is possible to remove just the temperature sensing means, with the ray-guiding means remaining attached to the heat fixing device.

Accordingly, in the present invention, maintenance of the temperature sensing means is simplified and the positional relationship between the ray-guiding means and the fixing means is maintained, because there is no need to remove the ray-guiding means. Therefore, the temperature sensing means always senses infrared rays radiating from a predetermined region with respect to the surface of the fixing means, so that the temperature sensing means can always measure the temperature of the surface of the fixing means accurately.

The temperature sensing means of the heat fixing device is preferably attached to the accommodation means.

In the present invention, the temperature sensing means is attached to the accommodation means, so that it is possible to remove the temperature sensing means together with the accommodation means from the heat fixing device. Alternatively, it is possible to remove the temperature sensing means alone from the heat fixing device.

The temperature sensing means of the heat fixing device is preferably a thermopile type of infrared sensor.

In the present invention, the temperature sensing means includes a thermopile type of infrared sensor, so that it is possible to measure the temperature of the surface of the fixing means accurately, even if the temperature sensing means is disposed separated from the fixing means.

The casing of the thermopile type of infrared sensor of the heat fixing device is preferably formed of the thermal insulation member.

Since the casing of the thermopile type of infrared sensor is the thermal insulation member, it is possible to suppress thermal conduction from the vicinity of the ray-guiding means and the casing to the thermopile type of infrared sensor.

Accordingly, any rise in the temperature of the thermopile type of infrared sensor can be suppressed, enabling highly accurate measurement of the temperature of the fixing means. It is possible to suppress deterioration of the thermopile type of infrared sensor.

The fixing means of the heat fixing device preferably includes a roller.

In the present invention, the fixing means is a roller, so that the medium to be fixed is pressed against the fixing medium for the fixing.

An image forming apparatus in accordance with the present invention is preferably provided with the heat fixing device.

The image forming apparatus of the present invention achieves effects similar to those of this heat fixing device.

BRIEF DESCRIPTION OF THE DRAWINGS

FIG. 19($b$) is an enlargement of the section of FIG. 19($a$);

DETAILED DESCRIPTION OF THE PREFERRED EMBODIMENT

Preferred embodiments of a heat fixing device and an image forming apparatus according to the present invention will be described below. The description relates to a laser printer as the image forming apparatus.

Figure 1:
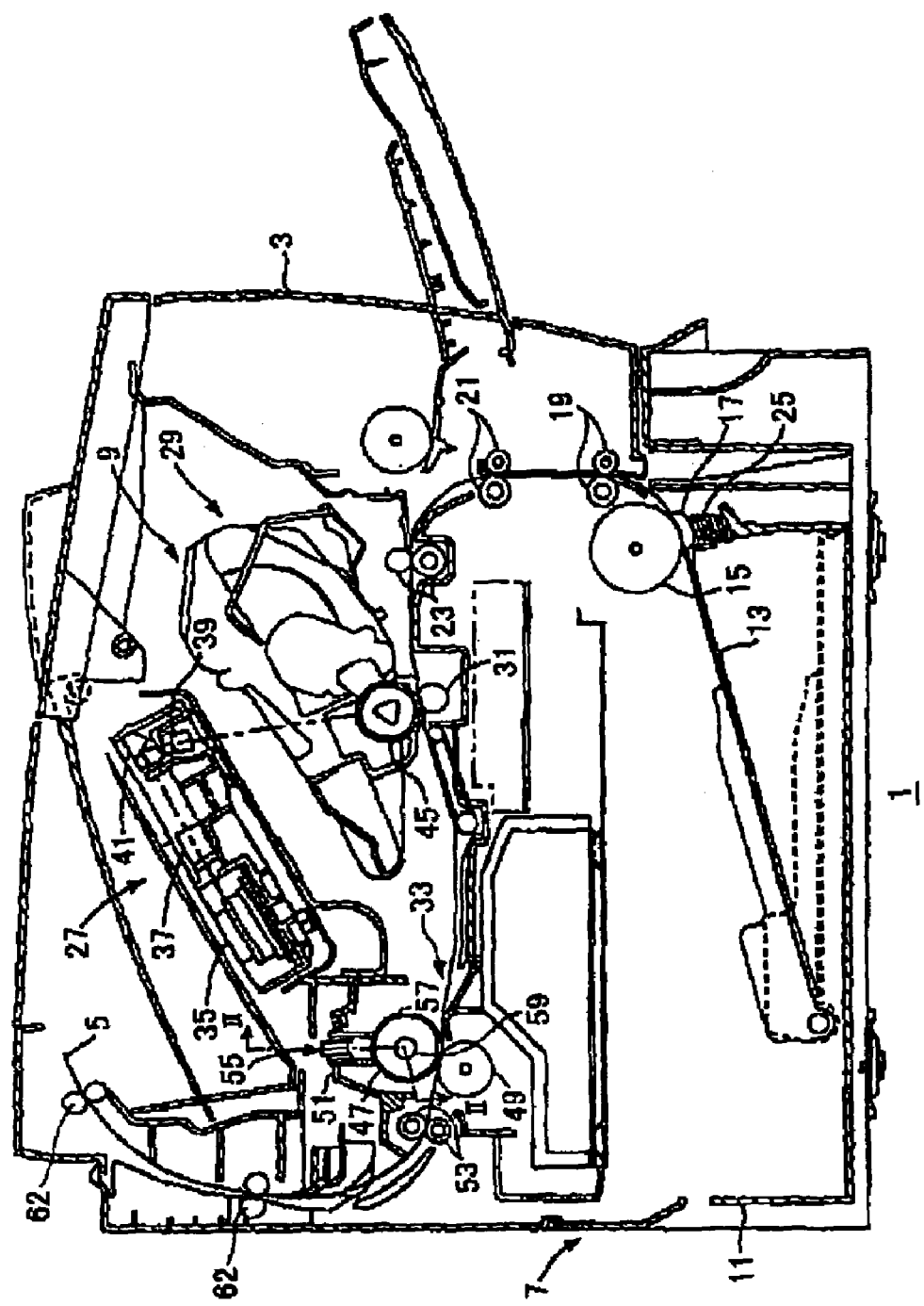
FIG. 1 shows a section through the side of essential components of the overall configuration of a laser printer in accordance with an embodiment of the present invention.
Figure 2:
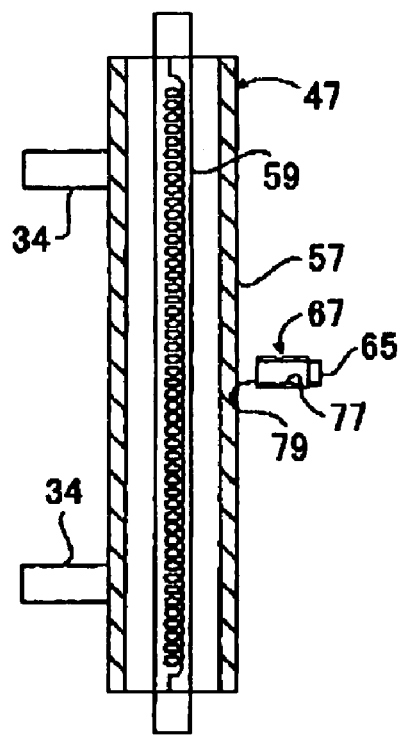
FIG. 2 is a section taken along the line II-II in FIG. 1, showing the heating roller, the conduit, and the temperature sensor of the laser printer of FIG. 1.

Embodiment 1 a) The description is first made for explaining the configuration of a laser printer in accordance with the Embodiment 1, with reference to FIG. 1. Note that FIG. 1 shows a section through the side of essential components of the laser printer. A section taken along the jointed line II-II in FIG. 1 is shown in FIG. 2, to illustrate the positional relationship between a heating roller 47, a temperature sensor 65, and removal claws 34.

A laser printer 1 includes a feeder portion 7 for supplying paper 5 as a fixing medium and an image forming portion 9 for forming a predetermined image on the supplied paper 5 in a main casing 3.

The feeder portion 7 has a paper supply tray 11 installed in a removable manner; a paper press plate 13 provided within the paper supply tray 11; a paper-supply roller 15 and a paper-supply pad 17 provided above one end of the paper supply tray 11; feed rollers 19 and 21 provided on the downstream side of the paper-supply roller 15 along the paper feeding direction; and register rollers 23 provided on the downstream side of the feed rollers 19 and 21 along the paper feeding within the main casing 3. Note that the upstream side and downstream side of the direction along which the paper 5 is fed are often referred to simply as the upstream side and downstream side hereinafter).

The paper press plate 13 is capable of holding the paper 5 in a stack and is supported in a swiveling manner at the far end portion from the paper-supply roller 15 so that the closest end portion of the plate 13 is able to move in the vertical direction. The plate 13 is also urged upward by a spring (not shown in the figure) from the rear side thereof. Thus the paper press plate 13 can swing downward against the resilient force of the spring about the end portion thereof that is far from the paper-supply roller 15, in accordance with any increase in the amount of stacked paper 5. The paper-supply roller 15 and the paper-supply pad 17 are disposed to face each other, with the paper-supply pad 17 being pressed towards the paper-supply roller 15 by a spring 25 disposed on the rear side of the paper-supply pad 17.

The abovementioned image forming portion 9 has a scanner unit 27, a process cartridge 29, a transfer roller 31, and a heat fixing device 33.

The scanner unit 27 is provided in an upper portion within the main casing 3 and is provided with a laser generation portion (not shown in the figure), a polygonal mirror 35 to be rotated, lenses 37 and 39, and a reflective mirror 41. A laser beam that is generated from this laser generation portion on the basis of predetermined image data is guided through the polygonal mirror 35, the lens 37, the reflective mirror 41, and the lens 39 in sequence, as shown by the broken line to irradiate the surface of a photoconductive drum 45 of the process cartridge 29 with a high-speed scan, which will be described later.

The process cartridge 29 is disposed below the scanner unit 27 and is configured in such a manner that it is installed in a freely removable manner with respect to the main casing 3. In addition to the photoconductive drum 45, the process cartridge 29 is provided with a scorotron type charger, a developer roller, and a toner container (not shown in the figure).

The toner container is filled with a polymer toner having a positively charged non-magnetic component, as the medium to be fixed, and this toner is supported as a thin layer of a constant thickness on the developer roller. The photoconductive drum 45 is disposed in a rotatable manner facing the developer roller. A main body of the drum 45 is grounded. A positively charged light-sensitive layer of a polycarbonate is formed on the surface of the drum 45.

The transfer roller 31 is disposed below the photoconductive drum 45 and in a rotatably supported state in the main casing 3 so as to face the photoconductive drum 45. This transfer roller 31 consists of a roller formed of an electrically conductive rubber material that covers a metal roller shaft. A predetermined transfer bias voltage is applied to the photoconductive drum 45.

The heat fixing device 33 is installed on the downstream side of the process cartridge 29, and is provided with the heating roller 47 as a fixing means; a press roller 49 that is disposed on the other side of the feed path of the paper 5 from the heating roller 47 to press the heating roller 47; a fixer case 51 (accommodation means) that covers the heating roller 47 and the press roller 49 from above: feed rollers 53 provided on the downstream side of the heating roller 47 and the press roller 49; and a temperature measurement unit 55 for measuring the surface temperature of the heating roller 47.

The heating roller 47 is provided with a circular cylindrical main roller body 57, which is formed of a tube of a metal such as aluminum, and a halogen lamp 59.

The halogen lamp 59 is provided along the axial direction within the main roller body 57, and configured to be heated by the supply of electrical power from a power source (not shown in the figure) so as to heat the main roller body 57.

Note that the heating roller 47 and the press roller 49 are supported in a rotatable manner on a pair of roller support members 61 that will be described later.

The press roller 49 has a metal roller shaft covered by a roller formed of an elastic body to press against the heating roller 47 at a predetermined pressure.

In addition, this heat fixing device 33 is provided with the removal claws 34 for scraping off the paper 5 which has adhered to the surface of the heating roller 47 during the fixing.

The removal claws 34 are formed of metal and have a substantially rectangular thin plate shape in plan view, as shown in FIG. 2, and have a substantially wedge shape in section (although this is not shown in the figures) such that they become gradually thinner towards the end portions thereof that act as scraper portions. As shown in FIG. 2, two removal claws 34 are disposed at a predetermined spacing at end portions of the axis of the heating roller 47 on the downstream side of the portion at which the heating roller 47 and the press roller 49 face each other, in the direction in which the paper 5 is fed. The end portions that form the scraper portions of the removal claws 34 are in contact with the heating roller 47, with the other end portions being supported on the fixer case 51.

When the paper 5 passes between the heating roller 47 and the press roller 49, the paper 5 adhering to the heating roller 47 is scraped from the surface of the heating roller 47 when the paper 5 is brought into contact with the removal claws 34 by the rotation of the heating roller 47.

Note that these removal claws 34 are placed in contact with the surface of the heating roller 47 by solenoids (not shown in the figure) only when the paper 5 is being fed to the heat fixing device 33. The removal claws 34 are normally separated from the heating roller 47.

Figure 3:
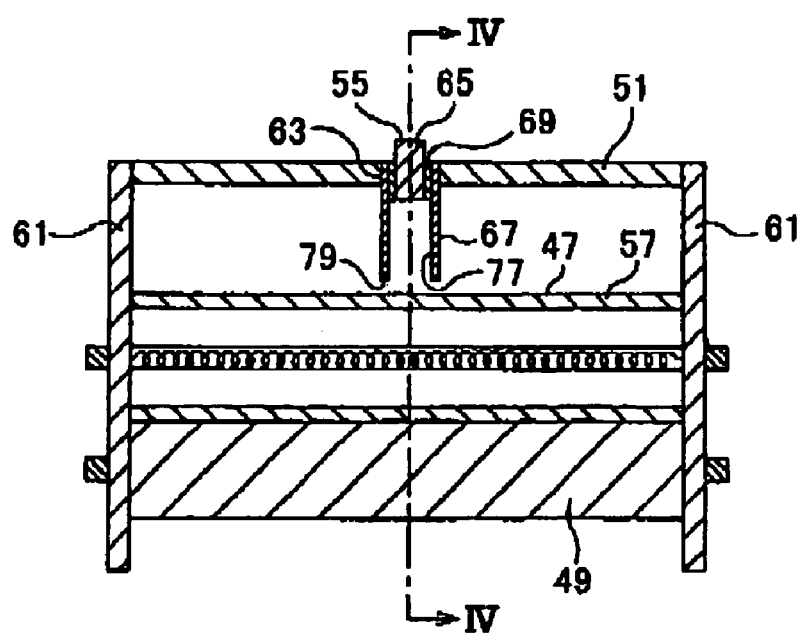
FIG. 3 is a section as seen from the front side (the right-hand side in FIG. 1) of the temperature measurement unit and peripheral portions thereof.
Figure 4:
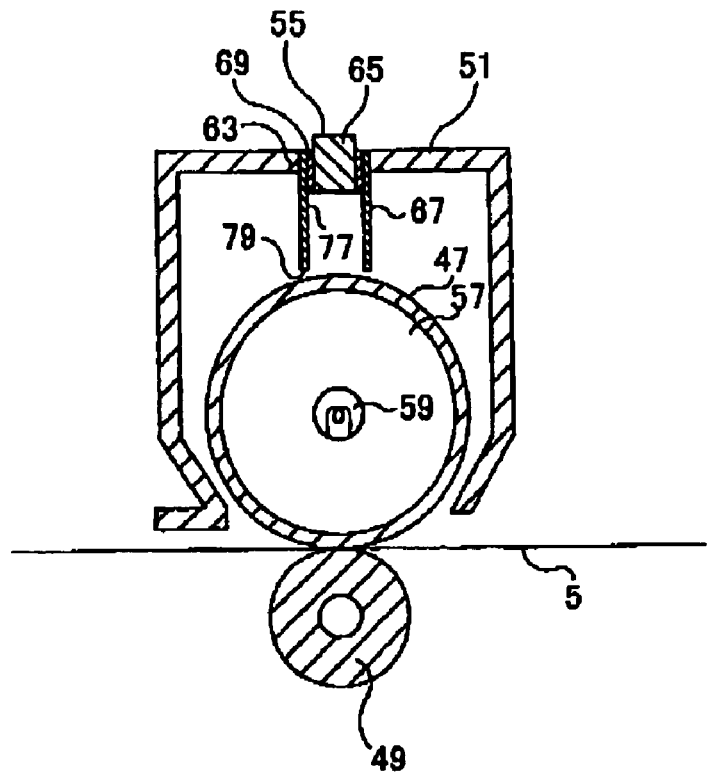
FIG. 4 is a section taken along the line IV-IV of FIG. 3.
Figure 5:
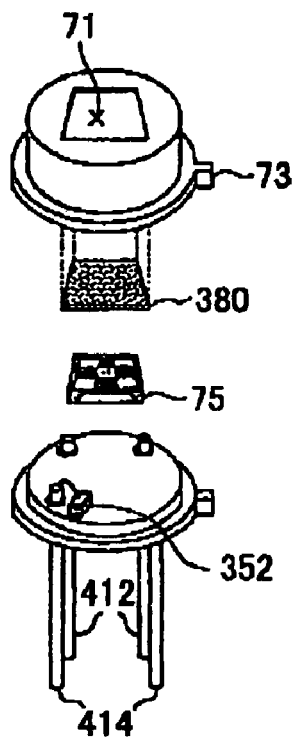
FIG. 5 is an exploded perspective view of the thermopile type of temperature sensor.
Figure 6:
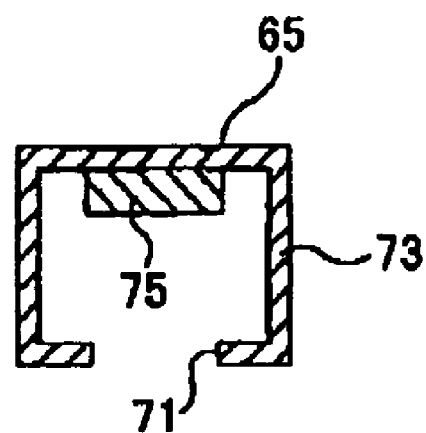
FIG. 6 is a section through the thermopile type of temperature sensor.

Note also that paper ejecting rollers 62 are provided on the downstream side of the heat fixing device 33.

b) The description now turns to details of the configuration of the temperature measurement unit 55, with reference to FIGS. 3 to 6. Note that FIG. 3 is a section as seen from the front side (the right-hand side in FIG. 1) of the temperature measurement unit 55 and peripheral portions thereof, and FIG. 4 is a section taken along the line IV-IV of FIG. 3. FIG. 5 is an exploded perspective view of the thermopile type of temperature sensor 65 and FIG. 6 is a section through the temperature sensor 65.

The temperature measurement unit 55 is disposed above the heating roller 47, as shown in FIGS. 3 and 4. The temperature measurement unit 55 is configured of the temperature sensor 65 accommodating a thermopile element 75 (temperature sensing means) which will be described later, a conduit 67 (ray-guiding means) attached vertically in a temperature measurement unit attachment hole 63 provided in the center of the upper surface of the fixer case 51, and a thermal insulation member 69 disposed between the temperature sensor 65 and the conduit 67.

The abovementioned temperature sensor 65 is configured of a cylindrical canister case 73 (casing for the thermopile type of infrared sensor) having an infrared ray incidence opening 71, and the thermopile element 75 (temperature sensing means) attached to the inner top surface of the canister case 73.

The thermopile element 75 is a non-contact type of infrared sensor that senses temperature by sensing the infrared rays that are radiated from the surface of the heating roller 47, without being in contact with that surface. More specifically, the thermopile element 75 is a thermopile type of infrared sensor that uses thermoelectromotive.

The thermopile element 75 has a substantially rectangular plate shape and is disposed 80 as to face the infrared ray incidence opening 71 within the canister case 73. The position of the thermopile element 75 is out of the fixer case 51 (above the fixer case 51 in FIGS. 3 and 4).

In addition, as shown in FIG. 5, the temperature sensor 65 is provided with a thermistor 352 that detects the temperature of the thermopile element 75, a pair of output pins 412 that output an electrical signal having a voltage level corresponding to the amount of infrared rays that the thermopile element 75 has received, and a pair of output pins 414 that output an electrical signal corresponding to the temperature of the thermopile element 75 detected by the thermistor 352.

As shown in FIG. 2, the temperature sensor 65 is disposed separated by a predetermined spacing from the heating roller 47, at substantially the center of the axial direction of the heating roller 47 (a direction orthogonal to the feed direction of the paper 5) so as not to overlap the removal claws 34 in the axial direction of the heating roller 47. The infrared ray incidence opening 71 is disposed facing the surface of the heating roller 47.

As shown in FIG. 5, the infrared ray incidence opening 71 is formed as an aperture of a substantially rectangular shape on the canister case 73. A filter 380 that interrupts infrared rays of wavelengths of 2 μm or less is provided in the infrared ray incidence opening 71.

Figure 22:
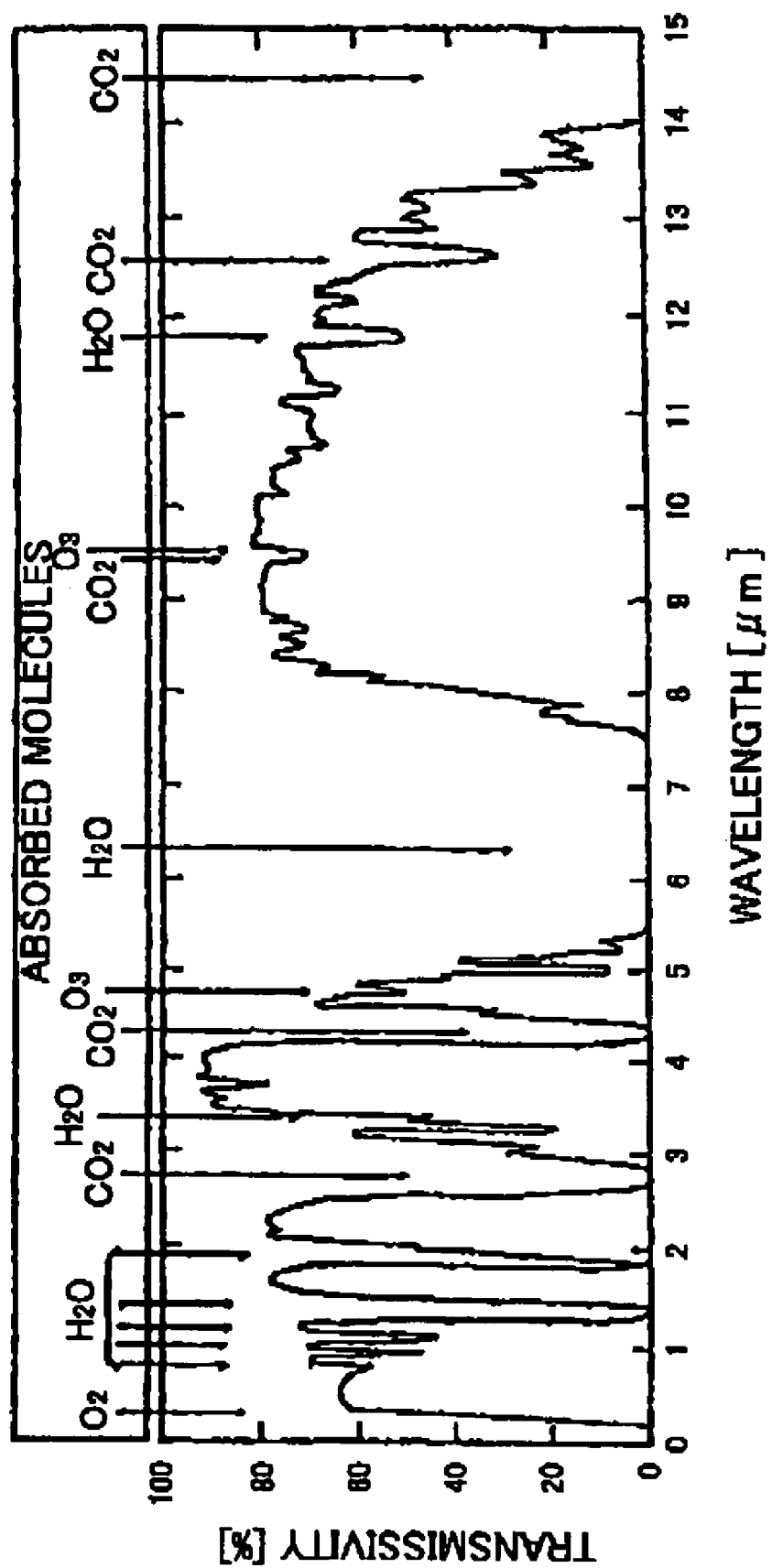
FIG. 22 is an illustrative view of the absorbance ratio of infrared rays traveling several km through the atmosphere, in which the wavelengths of infrared rays are plotted along the horizontal axis and the transmittance of the infrared rays is plotted along the vertical axis.

As announced by KAWAI Toshiteru of Hamamatsu Photonics K.K. at the 92nd meeting of the Sensing Technology Applications Research Group (on Friday, Aug. 19, 1994 in the Large Meeting Room of Mita Publishing), this is because infrared rays having the wavelengths of about 1.45 μm and 1.94 μm are readily absorbed by water vapor. Note that, although infrared rays having wavelengths of 5 to 8 μm are absorbed by water vapor if they have been transmitted over several kilometers through the atmosphere (FIG. 22 shows a graph of the relationship between transmissivity and wavelength of infrared rays that have been transmitted over several km through the atmosphere). The distance from the surface of the heating roller 47 to the thermopile element 75 in the heat fixing device 33 is within a range of 20 to 30 mm, so that the infrared rays having wavelengths of 5 to 8 μm are not absorbed as much as infrared rays having wavelengths of 1.45 μm or 1.94 μm to reach the thermopile element 75. However, it is preferable to attach the filter 380 that interrupts infrared rays having wavelengths less than 8 μm to ensure that the temperature is sensed more accurately.

The humidity within the laser printer 1 varies with the evaporation of moisture from the paper 5 when the toner is fused. The amount of the infrared rays received by the temperature sensor 65 changes in accordance with the change in the humidity. However, since the filter 380 interrupts infrared rays having the wavelength range in which humidity causes variations, the voltage level P of the electrical signal from the thermopile element 75 is not affected by the humidity changes.

The conduit 67 is formed of a hollow cylinder with the inner surface thereof being formed as a reflective surface 77 of a metal that reflects infrared. A metal such as aluminum, silver, or gold that has a reflectivity of at least 80% with respect to infrared rays is suitable as the metal that forms the reflective surface 77. More preferably, gold having a high reflectivity with respect to infrared rays (a reflectivity of about 98%) is more suitable. The main part of the conduit 67 (the portions other than the reflective surface 77) may be formed of the above-mentioned metal or another material.

The lower portion of the temperature sensor 65 is fitted into the thermal insulation member 69 within the aperture portion at the upper end of this conduit 67. And a aperture portion 79 at the lower end of the conduit 79 faces the surface of the heating roller 47.

Figure 7:
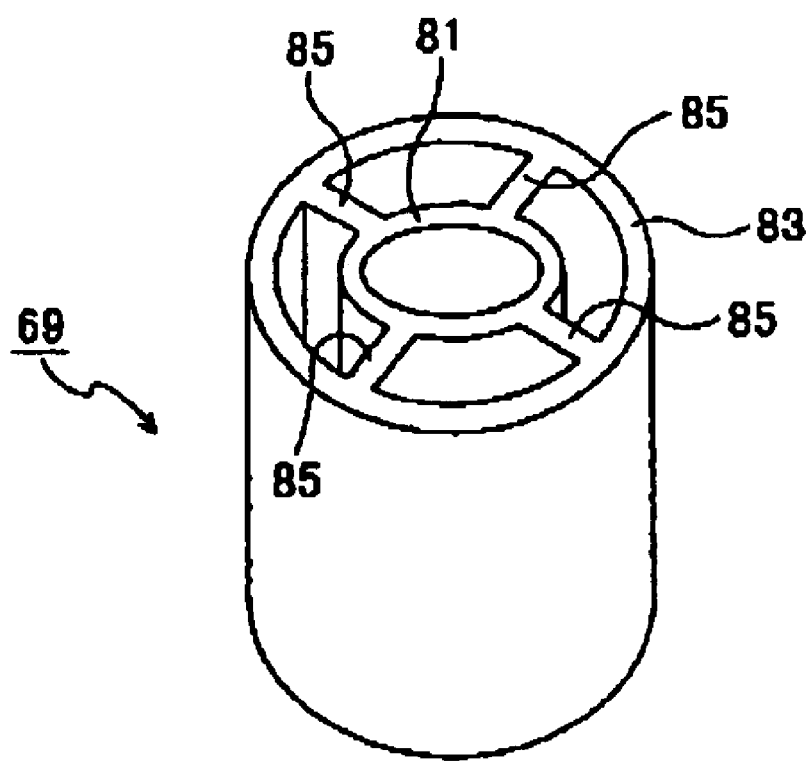
FIG. 7 is a perspective view of the configuration of a thermal insulation member.

The abovementioned insulation member 69 is formed of a polyimide that is a heat-resistant resin having a thermal conductivity of 0.2 W/mK. The insulation member 69 is configured of an inner cylindrical portion 81 that is a cylindrical member, an outer cylindrical portion 83 that is a cylindrical member disposed coaxially with and outside of the inner cylindrical portion 81, and connective portions 85 that connect together the inner cylindrical portion 81 and the outer cylindrical portion 83 at four locations, as shown in FIG. 7.

In the thermal insulation member 69, the lower portion of the canister case 73 of the temperature sensor 65 is accommodated inside of the inner cylindrical portion 81 of the thermal insulation member 69. And an upper portion of the inner surface of the conduit 67 is in contact with the outer side surface of the outer cylindrical portion 83.

c) The description now turns to the operation of the laser printer 1.

(1) The paper 5 at the uppermost position on the paper press plate 13 in the paper supply tray 11 of the feeder portion 7 is pressed towards the paper-supply roller 15 by the spring (not shown in the figure) from the rear side of the paper press plate 13. Each sheet of paper 5 is fed after being sandwiched between the paper-supply roller 15 and the paper-supply pad 17 by the rotation of the paper-supply roller 15. The thus-supplied paper 5 is sent onto the register rollers 23 by the feed rollers 19 and 21. The register rollers 23 are formed of a pair of rollers, which send the paper 5 onto an image formation position after registering the paper 5 to a predetermined position. The image formation position is the position at which the toner image on the photoconductive drum 45 is transferred to the paper 5. In this Embodiment, the image formation position is the position at which the photoconductive drum 45 and the transfer roller 31 are in contact with each other.

(2) After the surface of the photoconductive drum 45 of the image forming portion 9 has been positively charged uniformly by a scorotron type charger as the photoconductive drum 45 rotates, image formation position is exposed by a high-speed scan of a laser beam from the scanner unit 27 to form a latent electrostatic image based on image data. After that when image formation position is subsequently faced the developer roller, the toner which is supported on the developer roller and which is also positively charged is supplied to the latent electrostatic image formed on the surface of the photoconductive drum 45, in other words, the parts of the surface of the uniformly positively charged photoconductive drum 45 that have been exposed by the laser beam to have the reduced potential. The toner is selectively carried on the surface of the photoconductive drum 45 depending on the latent electrostatic image to form a visible image, thereby achieving a transferred image.

The visible image formed of a toner image supported on the photoconductive drum 45 is transferred to the paper 5 while the paper 5 that has been fed in by the process (1) is passing between the photoconductive drum 45 and the transfer roller 31. The paper 5 onto which the visible image has been transferred is fed onto the heat fixing device 33, which will be described next.

(3) In the heat fixing device 33, the toner image transferred onto the paper 5 is heated and fixed to the paper 5 while the paper 5 is passing between the heating roller 47 and the press roller 49.

The surface temperature of the heating roller 47 is measured constantly by the temperature measurement unit 55. In other words, infrared rays radiating from the surface of the heating roller 47 are reflected by the reflective surface 77 on the inner surface of the heating roller 47, and guided to the infrared ray incidence opening 71 of the temperature sensor 65. The infrared rays are then sensed by the thermopile element 75 of the temperature sensor 65. The output of the halogen lamp 59 of the heating roller 47 is adjusted on the basis of the sensed temperature, thereby maintaining the surface temperature of the main roller body 57 at a constant value.

The paper 5 that has been fixed in the heat fixing device 33 is ejected by the feed rollers 53 provided on the downstream side of the heat fixing device 33 and the paper eject rollers 62 disposed on the downstream side of these feed rollers 53.

d) The description now turns to the effects achieved by the heat fixing device and the image forming apparatus of the Embodiment 1.

In the heat fixing device 33, infrared rays radiating from the surface of the heating roller 47 are reflected by the reflective surface 77 within the conduit 67, guided to the infrared ray incidence opening 71 of the temperature sensor 65, and then sensed by the thermopile element 75 of the temperature sensor 65. Accordingly, it is possible to dispose the heating roller 47 and the temperature sensor 65 separately with a predetermined spacing and improve the durability of the temperature sensor 65 that is a non-contact type of infrared sensor having a lower thermal resistance.

Since the infrared rays radiating from the surface of the heating roller 47 are led by the conduit 67 to the thermopile element 75 of the temperature sensor 65, the temperature sensor 65 is prevented from sensing the temperature of portions other than the surface of the heating roller 47, thereby reducing sensing errors. Moreover, the infrared rays radiating from the surface of the heating roller 47 are incident onto the conduit 67 as a function of the internal dimensions of the aperture portion 79 through the aperture portion 79 of the conduit 67 facing the heating roller 47. The incident infrared rays are reflected by the reflective surface 77 within the conduit 67 and guided to the temperature sensor 65, so that the incident infrared rays arrive at the temperature sensor 65 without being greatly attenuated. For that reason, the temperature sensor 65 receives substantially the same amount of infrared rays as that of the incident infrared rays as a function of the internal dimension of the aperture portion 79 of the conduit 67. Accordingly, the presence of the conduit 67 interposed between the temperature sensor 65 and the heating roller 47 does not narrow the viewing angle, ensuring that infrared rays radiating from the surface of the heating roller 47 are sensed with a sufficient radiation intensity dependant on the original viewing angle. As a result, it is possible to achieve accurate temperature sensing.

Since the reflective surface 77 of the conduit 67 is formed from a metal, the reflective surface 77 that reflects the infrared rays radiating from the surface of the heating roller 47 with a high reflectivity can be formed in an accurate and satisfactorily manner, it is possible to achieve simple and accurate temperature sensing.

If the reflective surface 77 of the conduit 67 is formed of gold, in particular, the infrared rays radiating from the surface of the heating roller 47 are reflected with a reflectivity of about 98% to be guided to the thermopile element 75 of the temperature sensor 65 without substantial attenuation. Thus, it is possible to reliably achieve much more accurate temperature sensing.

In this embodiment, the temperature sensor 65 detects infrared rays of wavelengths of 2 μm and greater. When the surface roughness of the reflective surface 77 is set to a value below than the wavelengths of the infrared rays sensed by the temperature sensor 65 in order to prevent the infrared rays from being interfered to each other, it is possible to achieve more accurate temperature sensing.

In addition, the formation of the reflective surface 77 of a mirrored surface ensures that the infrared rays radiating from the surface of the heating roller 47 are led satisfactorily to the temperature sensor 65 without being impeded by the reflective surface 77. This arrangement makes it possible to reliably achieve even more accurate temperature sensing.

Note that the mirrored surface has a surface roughness of ¼ or less of the wavelengths sensed by the temperature sensor 65. In this embodiment, a surface roughness of the reflective surface 77 of 0.5 μm or less is preferable for sensing infrared rays of wavelengths of just 2 μm or more. Note that the ten-point average roughness (Rz) is used as the surface roughness in the present invention.

If the main part of the conduit 67 is formed of a resin and the reflective surface 77 is formed of a metal, the reflective surface 77 can be formed of the metal in a simple manner by forming the main body of the conduit 67 of the resin and plating the inner surface of the conduit 67.

Since the thus-formed conduit 67 has the main body made of a resin that has a lower thermal conductivity than that of a metal, transfer of heat from the surface of the heating roller 47 to the temperature sensor 65 is reduced. This arrangement makes it possible to prevent large attenuation of the infrared rays by the reflective surface 77 to achieve accurate temperature sensing and prevent damage to the temperature sensor 65 caused by heat, thereby improving the durability of the temperature sensor 65.

Since a non-contact type of infrared sensor is often used to sense changes in the temperature of an object to be measured, and there is no sensing output when there are no changes in the temperature of the object to be measured, it is inconvenient in that the non-contact type of infrared sensor cannot sense the actual temperature of the object to be measured continuously. For that reasons to sense the actual temperature of the heating roller 47 continuously by such a non-contact type of infrared sensor, it is necessary to provide a shutter between the heating roller 47 and the infrared sensor for shutting off and passing the infrared rays intermittently, making the device configuration complicated.

However, since a thermopile type of infrared sensor is used as the temperature sensor 65 in the heat fixing device 33, it is possible to sense the temperature of the heating roller 47 continuously, even if there are no changes in the temperature. It is therefore possible to sense the temperature of the surface of the heating roller 47 continuously with a simple configuration. This arrangement makes it possible to achieve more accurate temperature sensing.

In addition, the heat fixing device 33 includes the heating roller 47 to be heated and the press roller 49 that press the heating roller 47 so that it is possible to heat and press the paper 5 while the paper 5 is being fed between the press roller 49 and the heating roller 47. Moreover, since the temperature sensor 65 senses the temperature of the surface of the heating roller 47, it is possible to maintain the surface reliably at a fixing temperature and thus achieve favorable heat fixing.

The portions of the surface of the heating roller 47 in contact with the removal claws 34 are likely to become damaged during long-term usage. If the portions of the surface of the heating roller 47 are damaged, the toner can penetrate the thus-damaged portions so that the surfaces of the heating roller 47 can become blackened to cause changes in the emissivity of infrared rays at those portions. The change in the emissivity of infrared rays causes a problem in that sensing errors of the temperature sensor 65 may increase. Since the temperature sensor 65 in this heat fixing device 33 is disposed not to overlap the removal claws 34 in the axial direction of the heating roller 47, the temperature sensor 65 does not sense the surfaces of those portions so that such sensing errors caused by the removal claws 34 can be prevented efficiently, even if there is damage to the surface of the heating roller 47 at the contact portions of the removal claws 34.

Furthermore, since the thermopile element 75 of the temperature sensor 65 is positioned on the outer side of the fixer case 51, there is little rise in the temperature of the thermopile element 75 even if the heat generated from the heating roller 47 causes the temperature within the fixer case 51 to rise. This arrangement makes it possible to achieve accurate temperature sensing and to suppress deterioration of the thermopile element 75.

Since the length and aperture size of the conduit 67 are set so that only infrared rays radiating from the surface of the heating roller 47 are incident on the temperature sensor 65, there is no possibility that the infrared rays radiating from portions other than the surface of the heating roller 47 generate temperature sensing errors.

Since the thermal insulation member 69 having a thermal conductivity of 10 W/mK or less is provided between the canister case 73 of the temperature sensor 65 and the conduit 67, the thermal insulation member 69 prevents thermal conduction from occurring from the conduit 67 to the canister case 73, and then prevents the temperature of the thermopile element 75 attached to the canister case 73 from rising.

This arrangement ensures that the temperature measurement done by the thermopile element 75 is highly accurate. This arrangement also makes it possible to suppress deterioration of the thermopile element 75.

The inner cylindrical portion 81 and the outer cylindrical portion 83 of the thermal insulation member 69 are connected only by the connective portions 85. In other words, in the thermal conduction path from the conduit 67 through the thermal insulation member 69 to the canister case 73, the connective portions 85 have a smaller sectional area perpendicular to the direction of thermal conduction than those of the inner cylindrical portion 81 and the outer cylindrical portion 83. This arrangement prevents thermal conduction from occurring from the conduit 67 to the canister case 73, suppressing the rise in temperature of the thermopile element 75. As a result, the temperature measurement done by the thermopile element 75 is more accurate and also deterioration of the thermopile element 75 is suppressed.

Embodiment 2 a) The configuration of the laser printer 1 of the Embodiment 2 will now be described with reference to FIGS. 8 and 9.

Figure 8:
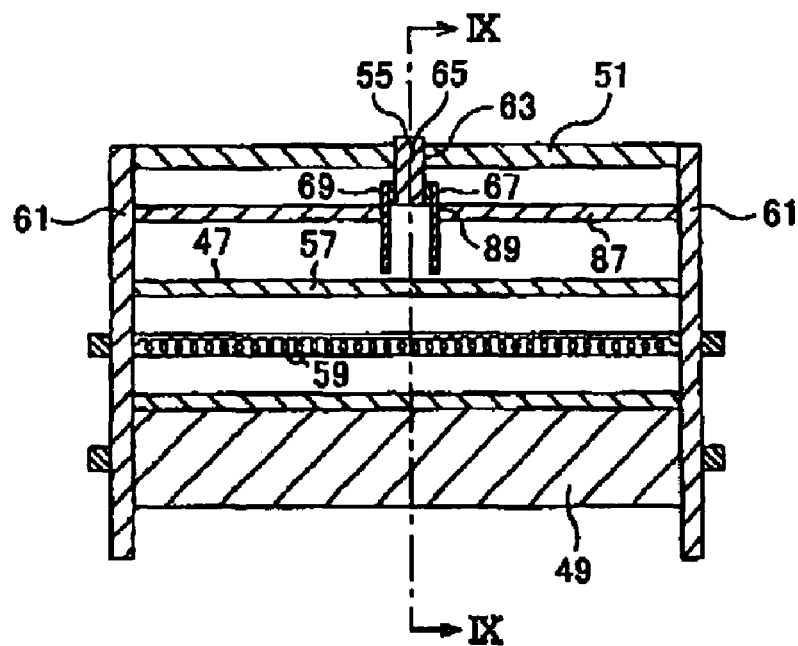
FIG. 8 is a section as seen from the front side (the right-hand side in FIG. 1) of the temperature measurement unit 55 and peripheral portions thereof.
Figure 9:
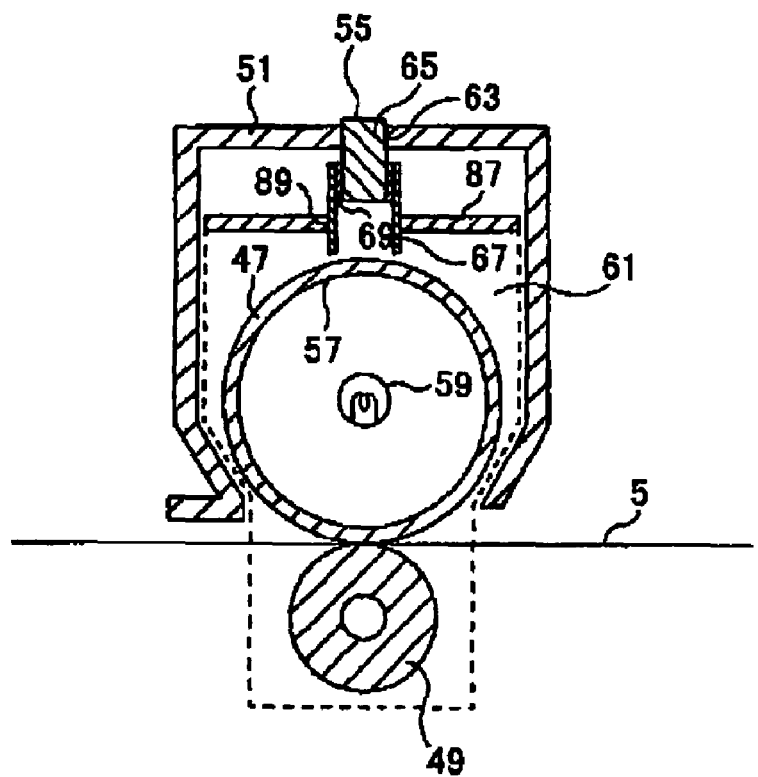
FIG. 9 is a section taken along the line IX-IX of FIG. 8.

FIG. 8 is a section as seen from the front side (the right-hand side in FIG. 1) of the temperature measurement unit 55 and peripheral portions thereof and FIG. 9 is a section taken along the line IX-IX of FIG. 8.

Note that the configuration of the laser printer 1 of the Embodiment 2 is basically the same as that of the laser printer 1 of the Embodiment 1, so that a description of similar portions is omitted.

In the Embodiment 2, a pair of roller support members 61 that support the axes of the heating roller 47 and the press roller 49 at the left and right sides are connected by a conduit support member 87 that is a plate-shaped member that is disposed horizontally. The conduit 67 is fitted into a conduit attachment hole 89 provided at the center of the conduit support member 87.

The temperature sensor 65 is attached to the temperature measurement unit attachment hole 63 of the fixer case 51.

Note that the thermal insulation member 69 is provided between the temperature sensor 65 and the conduit 67, in a similar manner to that of Embodiment 1.

b) The effects exhibited by the laser printer 1 of the Embodiment 2 will now be described.

Since the conduit 67 of the laser printer 1 of the Embodiment 2 is attached through the conduit support member 87 to the roller support members 61 that support the heating roller 47, the positional relationship of the conduit 67 with respect to the heating roller 47 can always be kept fixed. This arrangement ensures that the temperature sensor 65 in the heat fixing device 33 can always sense the infrared rays radiating from a predetermined area on the surface of the heating roller 47.

As a result, the temperature sensor 65 can always measure the surface temperature of the heating roller 47 accurately.

In the laser printer 1 of the Embodiment 2, the conduit 67 is attached to the conduit support member 87 and is the temperature sensor 65 is attached to the casing. It is therefore possible to remove the temperature sensor 65 together with the fixer case 51 or the temperature sensor 65 alone, with the conduit 67 being attached to the conduit support member 87.

This arrangement enables simple removal of the temperature sensor 65 for maintenance, the arrangement also ensures no change in the positional relationship between the conduit 67 and the heating roller 47, since it is not necessary to remove the conduit 67 from the sensor 65. In other words, the laser printer 1 of the Embodiment 2 can have both superior maintainability and accurate temperature sensing.

Embodiment 3

Figure 10:
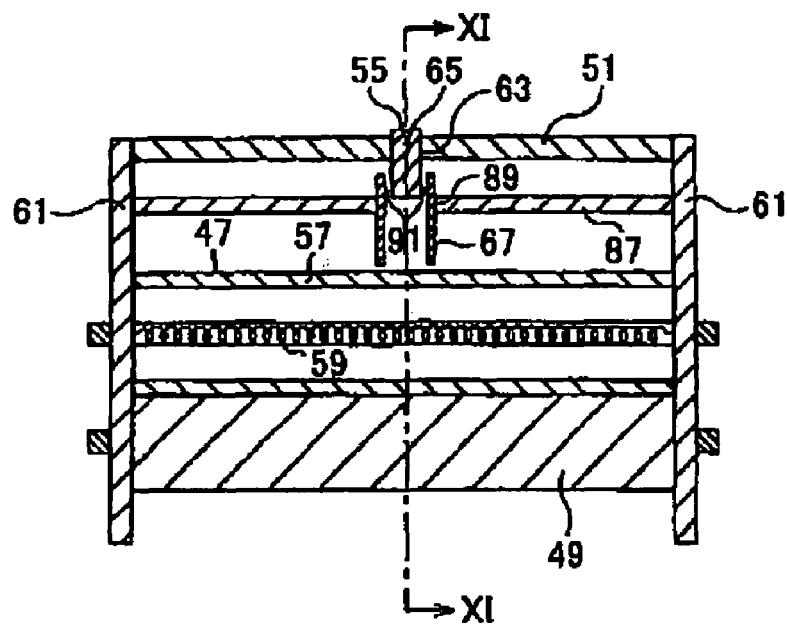
FIG. 10 is a section as seen from the front side (the right-hand side in FIG. 1) of the temperature measurement unit 55 and peripheral portions thereof.
Figure 11:
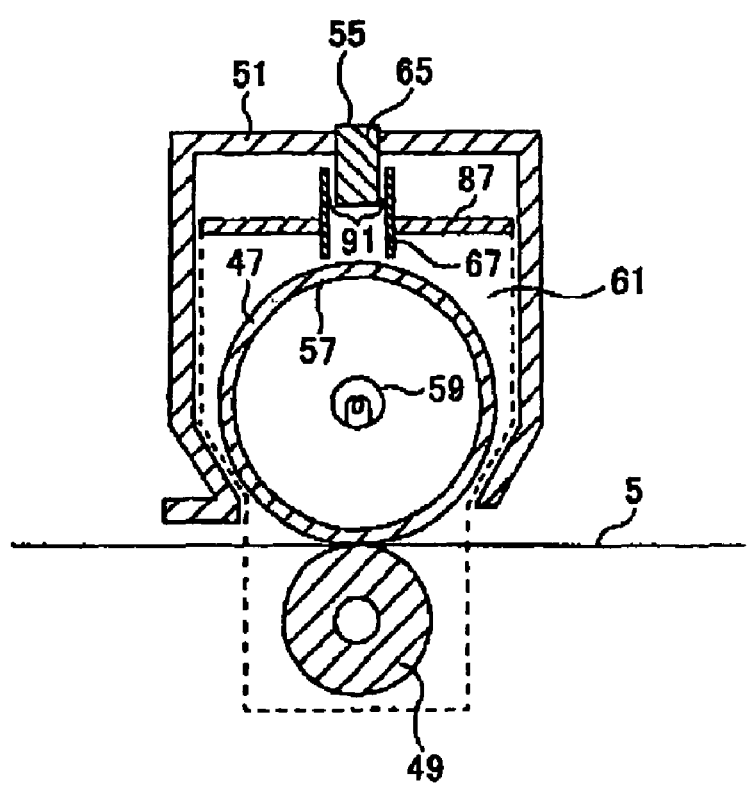
FIG. 11 is a section taken along the line XI-XI of FIG. 10.

The description now turns to a laser printer according to Embodiment 3.

a) The configuration of the laser printer 1 of the Embodiment 3 will be described first, with reference to FIGS. 10 and 11. This FIG. 10 is a section as seen from the front side (the right-hand side in FIG. 1) of the temperature measurement unit 55 and peripheral portions thereof, and FIG. 11 is a section taken along the line XI-XI of FIG. 10.

Note that the configuration of the laser printer 1 of the Embodiment 3 is basically the same as that of the laser printer 1 of the Embodiment 2. Thus portions that are the same as the corresponding ones of Embodiment 2 are omitted herein.

In the laser printer 1 in accordance with the Embodiment 3, there is no thermal insulation member 69 between the temperature sensor 65 and the conduit 67 in the temperature measurement unit 55, so that the corresponding area to the thermal insulation member 69 is a gap 91. In other words, the temperature sensor 65 and the conduit 67 are separated by air.

b) The effects exhibited by the laser printer 1 of the Embodiment 3 will now be described.

In this embodiment, since the gap 91 filled with air of a lower thermal conductivity is formed between the canister case 73 of the temperature sensor 65 and the conduit 67, thermal conduction from the conduit 67 to the canister case 73 can be prevented. A rise in the temperature of the thermopile element 75 attached to the canister case 73 can be prevented.

This arrangement ensures that the temperature measurement done by the thermopile element 75 is highly accurate. This arrangement also can suppress deterioration of the thermopile element 75.

Figure 12:
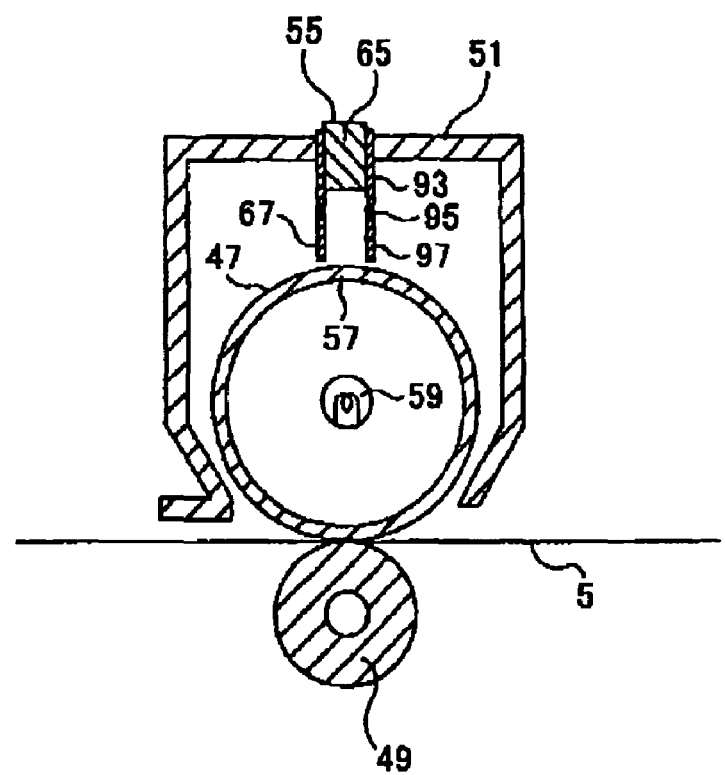
FIG. 12 is a section as seen from the front side (the right-hand side in FIG. 1) of the temperature measurement unit 55 and peripheral portions thereof.

Embodiment 4 a) The configuration of the laser printer 1 in accordance with the Embodiment 4 will now be described, with reference to FIG. 12. FIG. 12 is a section as seen from the front side (the right-hand side in FIG. 1) of the temperature measurement unit 55 and peripheral portions thereof.

Note that the basic configuration of the laser printer 1 of the Embodiment 4 is the same as that of the laser printer 1 of the Embodiment 1, so description of similar portions is omitted.

The conduit 67 in the laser printer 1 of the Embodiment 4 is configured of an upper cylindrical metal portion 93, an intermediate cylindrical resin portion 95 (a higher thermal conductivity resistance portion), and a lower cylindrical metal portion 97, which are joined together. The inner surface of the conduit 67 is formed to be the reflective surface 77, in a similar manner to the Embodiment 1.

The abovementioned intermediate resin portion 95 is formed of a heat-resistant resin having a thermal conductivity of 0.2 W/mK, and the length along the vertical direction (the vertical direction in FIG. 12) is 1 mm.

b) The effects exhibited by the laser printer 1 of the Embodiment 4 will now be described.

In the laser printer 1 of the Embodiment 4, the intermediate resin portion 95 formed of a material having a thermal conductivity of 10 W/mK or less and having a length of at least 1 μm is provided in the central portion of the conduit 67. For that reason, thermal conduction from the heating roller 47 through the conduit 67 to the temperature sensor 65 can be prevented in the path. A rise in temperature of the thermopile element 75 of the temperature sensor 65 can be suppressed. As a result, the temperature measurement done by the thermopile element 75 is highly accurate, and it is possible to suppress deterioration of the thermopile element 75.

Embodiment 5 a) The configuration of the laser printer 1 of the Embodiment 5 is basically the same as that of the laser printer 1 of the Embodiment 1.

It should be noted, however, that the main body of the conduit 67 of the laser printer 1 of the Embodiment 5 is formed of a heat-resistant resin having a thermal conductivity of 0.2 W/mK. Note that the reflective surface 77 formed on the inner surface of the conduit 67 is similar to that of Embodiment 1. In other words, the main body of the conduit 67 of the Embodiment 5 is formed as a high thermal conductivity resistance portion.

b) Since the main body of the conduit 67 of the laser printer 1 of the Embodiment 5 is formed of a heat-resistant resin having a thermal conductivity of 10 W/mK or less, thermal conduction from the heating roller 47 through the conduit 67 to the temperature sensor 65 can be prevented in the path, and any rise in temperature of the thermopile element 75 of the temperature sensor 65 can be suppressed. This arrangement ensures that the temperature measurement done by the thermopile element 75 is accurate and it is possible to suppress deterioration of the thermopile element 75.

Figure 13:
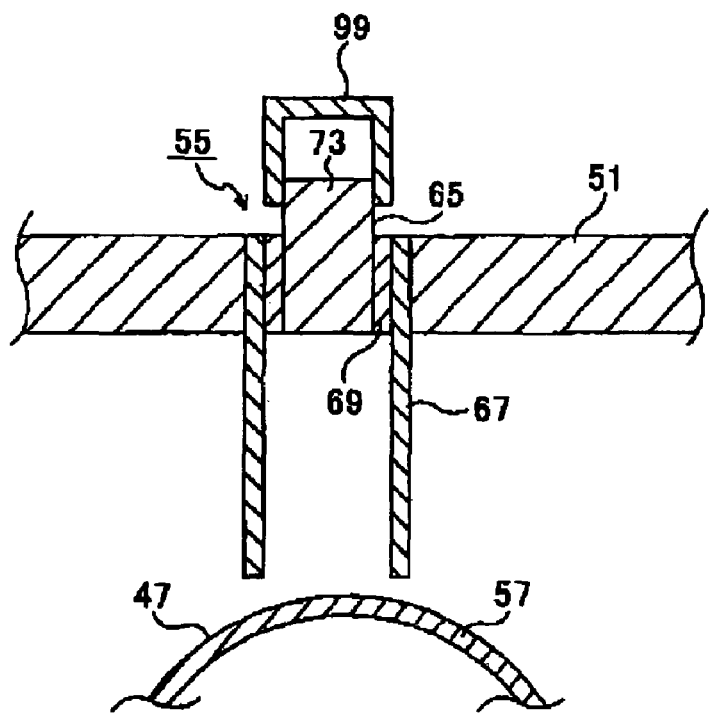
FIG. 13 is a section in the vicinity of the temperature measurement unit.

Embodiment 6 a) The configuration of the laser printer 1 of the Embodiment 6 will now be described with reference to Figs. 13 to 17. FIG. 13 is a section showing the vicinity of the temperature measurement unit 55 and FIGS. 14 to 17 are perspective views of the configuration of a radiator 99, which will be described later.

Note that the configuration of the laser printer 1 of the Embodiment 6 is basically the same as that of the laser printer 1 of Embodiment 1, so that description of similar portions is omitted.

Figure 14:
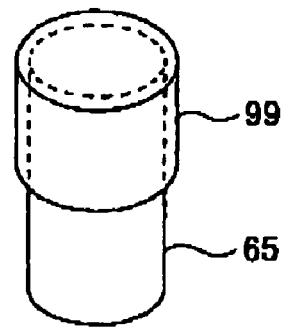
FIG. 14 is a perspective view of the configuration of a radiator.

In the laser printer 1 of the Embodiment 6, the upper portion of the canister case 73 of the temperature sensor 65 is covered by a circular cylindrical radiator 99, as shown in FIGS. 13 and 14.

Figure 15:
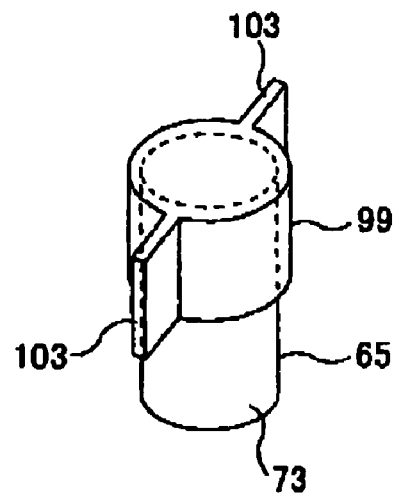
FIG. 15 is a perspective view of the configuration of a radiator.
Figure 16:
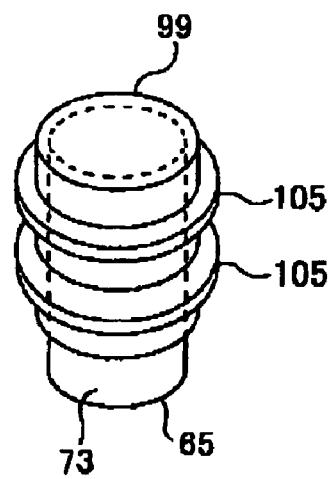
FIG. 16 is a perspective view of the configuration of a radiator.

The radiator 99 can be formed of a cylindrical radiator body 101 and vertical fins 103 formed perpendicular to the side surface of the radiator body 101, as shown in FIG. 15. Alternatively, the radiator 99 can be formed of the cylindrical radiator body 101 and annular horizontal fins formed on the side surface of the radiator body 101, as shown in FIG. 16.

Figure 17:
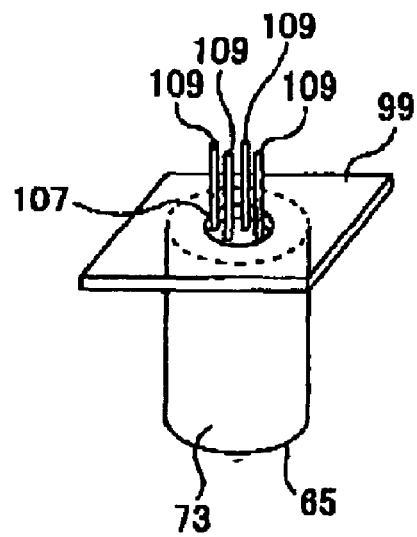
FIG. 17 is a perspective view of the configuration of a radiator.
Figure 18:
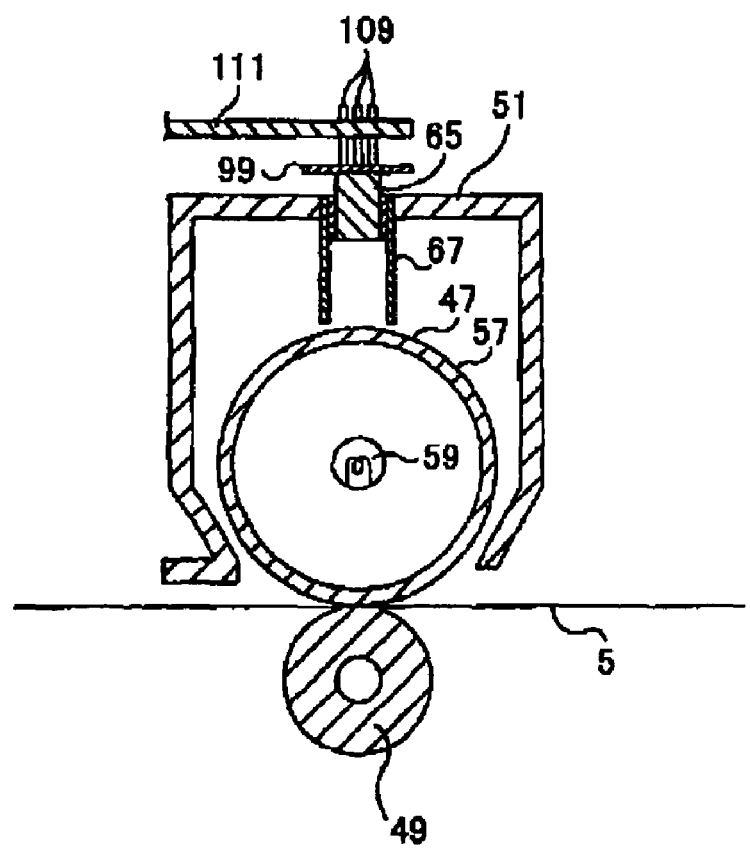
FIG. 18 is a section as seen from the front side (the right-hand side in FIG. 1) of the temperature measurement unit and radiator thereof.

In addition, the radiator 99 can be of a plate form attached to the upper surface of the canister case 73 of the temperature sensor 65, as shown in FIG. 17. The plate-shaped radiator 99 is provided with a terminal extraction hole 107 on and around the center. If a temperature sensor 65 that is provided with terminals 109 protruding upward is used, the terminals 109 protruding from the terminal extraction hole 107 can be connected to a circuit board 111, as shown in FIG. 18. Note that the circuit board 111 can have various components mounted thereon, such as am amplifier for amplifying an output signal that is output by the thermopile element 75 and an electronic component for adjusting the output of the halogen lamp 59 that is provided for the heating roller 47, based on the output signal of the amplifier.

In addition to being mounted on the canister case 73, the radiator 99 can be placed in contact with another component of the laser printer 1 (such as the main casing 3) to dissipate the heat of the canister case 73 to the another component.

b) The effects exhibited by the laser printer 1 of the Embodiment 6 will now be described.

Since the radiator 99 is mounted on the canister case 73 of the laser printer 1 of the Embodiment 6, the canister case 73 has a high thermal radiation effect. A rise in the temperature of the thermopile element 75 mounted in the canister case 73 can be prevented. For that reason, the temperature measurement done by the thermopile element 75 is more accurate. It is possible to suppress deterioration of the thermopile element 75.

The radiator 99 provided with the vertical fins 103 or the horizontal fins 105 has the radiation effect, so the rise in temperature of the thermopile element 75 can be suppressed.

Embodiment 7

The configuration of the laser printer 1 of the Embodiment 7 is basically substantially the same as the laser printer 1 of the Embodiment 1.

It should be noted, however, that the canister case 73 of the temperature sensor 65 of the laser printer 1 of the Embodiment 7 is formed of a heat-resistant resin that has a high thermal conduction resistance (a thermal conductivity of 0.2 W/mK).

In other words, since the canister case 73 of the Embodiment 7 acts as a high thermal conductivity resistance portion maintaining the conduit 67 and the thermopile element 75 separated, thermal conduction from the conduit 67 to the thermopile element 75 is suppressed even if the temperature of the conduit 67 rises.

This arrangement suppresses any rise in the temperature of the thermopile element 75, increasing the accuracy of temperature measurement by the thermopile element 75. Accordingly, it is possible to suppress deterioration of the thermopile element 75.

The description now turns to a configuration in which such as the heating roller 47, the conduit 67, and the temperature sensor 65, are disposed optimally in the laser printer 1 in order to achieve more accurate temperature sensing. This configuration can be applied to any of the above-described embodiments 1 to 7.

Figure 19A:
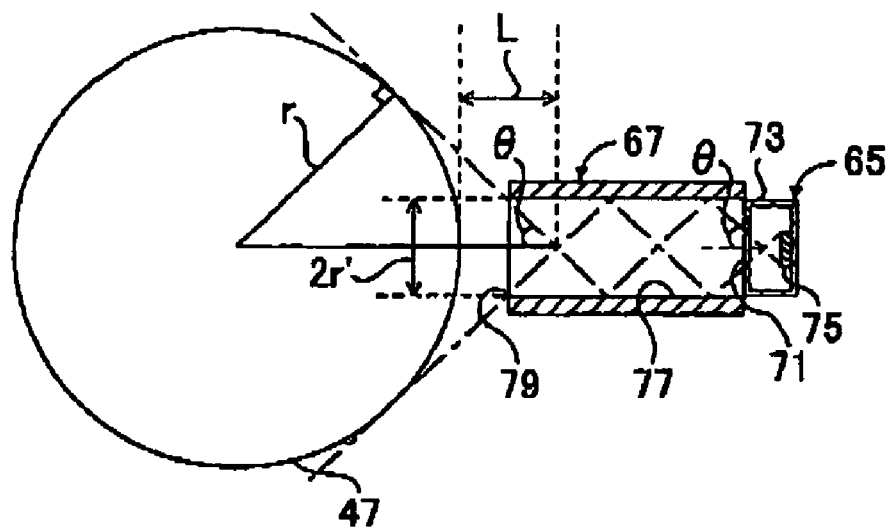
FIG. 19($a$) is a side section in the vicinity of the heating roller, the conduit, and the temperature sensor.

As shown in FIGS. 19(*a*) and 19(*b*), in the heat fixing device 33, the diameter of the heating roller 47 is set as 2r, the internal dimension of the aperture portion 79 of the conduit 67 in the direction orthogonal to both the axial direction of the heating roller 47 and the longitudinal direction of the conduit 67 is set as 2r', the gap between the surface of the heating roller 47 and the conduit 67 is set as a gap d, and the viewing angle of the temperature sensor 65 is set as θ. In this case, the above components are disposed in order to satisfy the following Equation (1):

$$0 < d \leq r\{(1/\sin\theta) - 1\} - r'/\tan\theta \quad (1)$$

In this case, the viewing angle is the angle at which the sensitivity is about 50% with respect to the sensitivity of temperature sensed by the thermopile element 75 through the infrared ray incidence opening 71 when an object to be measured is disposed directly in front thereof (the angle θ in FIGS. 19(*a*) and 19(*b*)). In these embodiments, a viewing angle of ±26° or a viewing angle of ±60° are used, by way of example.

In other words, since the inner surface of the conduit 67 of the heat fixing device 33 is formed as the reflective surface 77, infrared rays radiating from the surface of the heating roller 47 arrive at the infrared ray incidence opening 71 without being attenuated, regardless of the length in the longitudinal direction of the conduit 67 (hereinafter called the "cylinder length'). When the temperature sensor 65 having a viewing angle θ can see the surface of the heating roller 47 of radius r precisely in the viewing angle θ through the conduit 67 in which the internal dimension of the hollow aperture portion 79 is 2r', the apparent distance from the surface of the heating roller 47 to the temperature sensor 65 can be considered as L. The apparent distance L satisfies the following Equation (2) shown in FIG. 19(a):

$$\sin\theta = r'/(r+L) \therefore L = r\{(1/\sin\theta)-1\} \quad (2)$$

Figure 19B:
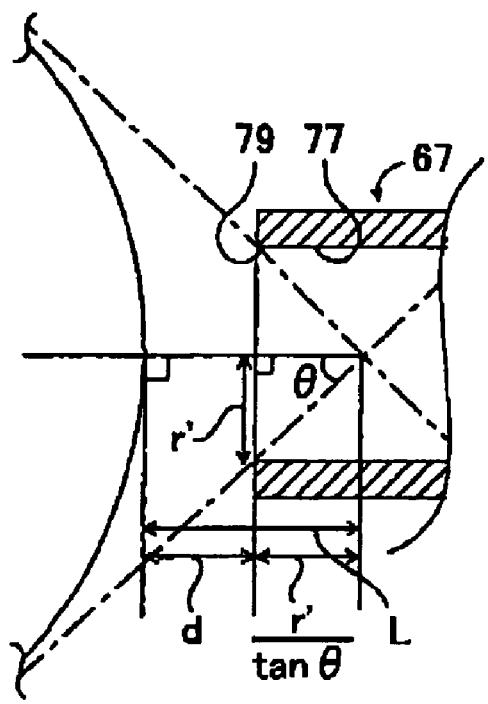

If the distance from the aperture portion 79 of the conduit 67 to the surface of the heating roller 47 is assumed to be the gap d, the apparent distance L satisfies the following Equation (3), as shown in FIG. 19(b):

$$L = d + r'/\tan\theta \quad (3)$$

Substituting the above Equation (2) into Equation (3) gives:

$$d + r'/\tan\theta = r\{(1/\sin\theta)-1\} \therefore d = r\{(1/\sin\theta)-1\} - r'/\tan\theta$$

Since the conduit 67 and the heating roller 47 are not in contact, the gap d is set to be within range of Equation (1):

$$0 < d \leq r\{(1/\sin\theta)-1\} - r'/\tan\theta \quad (1)$$

When the conduit 67 is disposed with respect to the heating roller 47 in such a manner to satisfy the Equation (1), it is possible to prevent the sensing of the temperature of portions other than the surface of the heating roller 47 more reliably, while maintaining the predetermined gap d between the surface of the heating roller 47 and the conduit 67. Accordingly, it is possible to dispose the components optimally and achieve more accurate temperature sensing.

Figure 20:
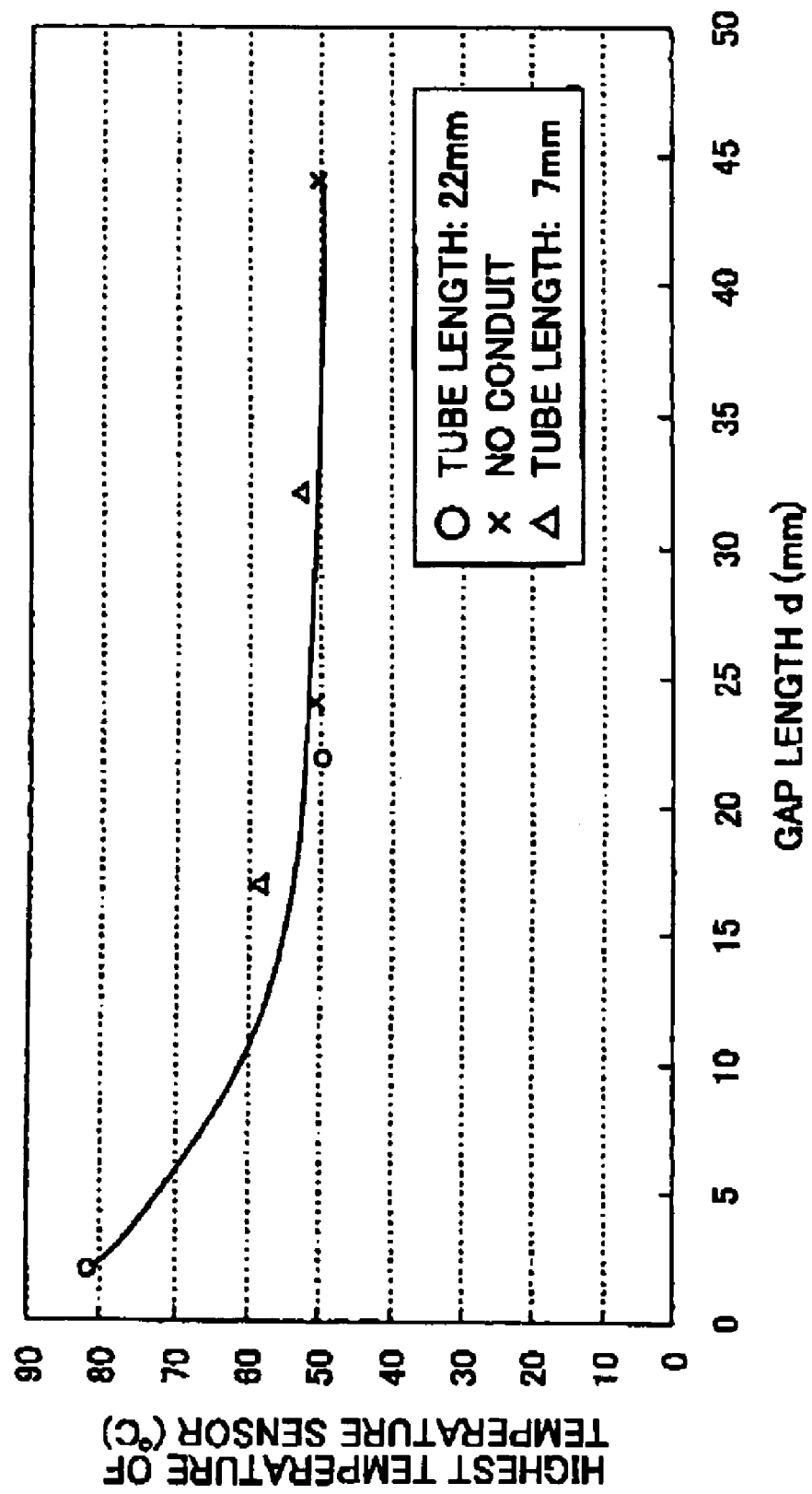
FIG. 20 is a graph of the relationship between the highest temperature of the temperature sensor and the gap length between the surface of the heating roller and the temperature sensor.

FIG. 20 shows the highest temperatures of the temperature sensor 65 when conduits 67 formed of a metal (aluminum) having cylinder lengths of 7 mm and 22 mm are used and the gap d between the surface of the heating roller 47 and the temperature sensor 65 is varying, and when no conduit is used and the gap d between the surface of the heating roller 47 and the temperature sensor 65 is varying, with a room temperature of 28° C. and the fixing temperature of the heating roller 47 of 200° C.

In FIG. 20, when the gap d is smaller than about 20 mm, the temperature of the temperature sensor 65 increases as the gap d is reduced. When the gap d is about 20 mm or greater, the temperature of the temperature sensor 65 is maintained constant at the vicinity of 50° C., regardless of the presence of the conduit 67 and the length of the cylinder.

Thus, when the heating roller 47 and the conduit 67 are disposed to make the gap d of at least 20 mm between the surface of the heating roller 47 and the conduit 67, it is possible to efficiently suppress the transmission of heat from the surface of the heating roller 47 to the conduit 67, even if the entire conduit 67 is formed of a metal with a high coefficient of thermal conductivity. For that reason, when the gap d of at least 20 mm between the surface of the heating roller 47 and the conduit 67 is provided, it is possible to prevent damage to the temperature sensor 65 due to heat from the conduit 67 formed of metal, thereby improving the durability of the temperature sensor 65.

If the main body of the conduit 67 is formed of a resin with a lower thermal conductivity, thermal conduction to the temperature sensor 65 by the conduit 67 can be substantially ignored, so that the spacing between the surface of the heating roller 47 and the temperature sensor 65 can be made at least 20 mm. This arrangement makes it possible to efficiently suppress the transmission of heat from the surface of the heating roller 47 through the conduit 67 having a main body made of resin. For that reason, it is possible to prevent damage to the temperature sensor 65 due to heat from the conduit 67 which has a main body formed of a resin, thereby improving the durability of the temperature sensor 65.

Figure 21:
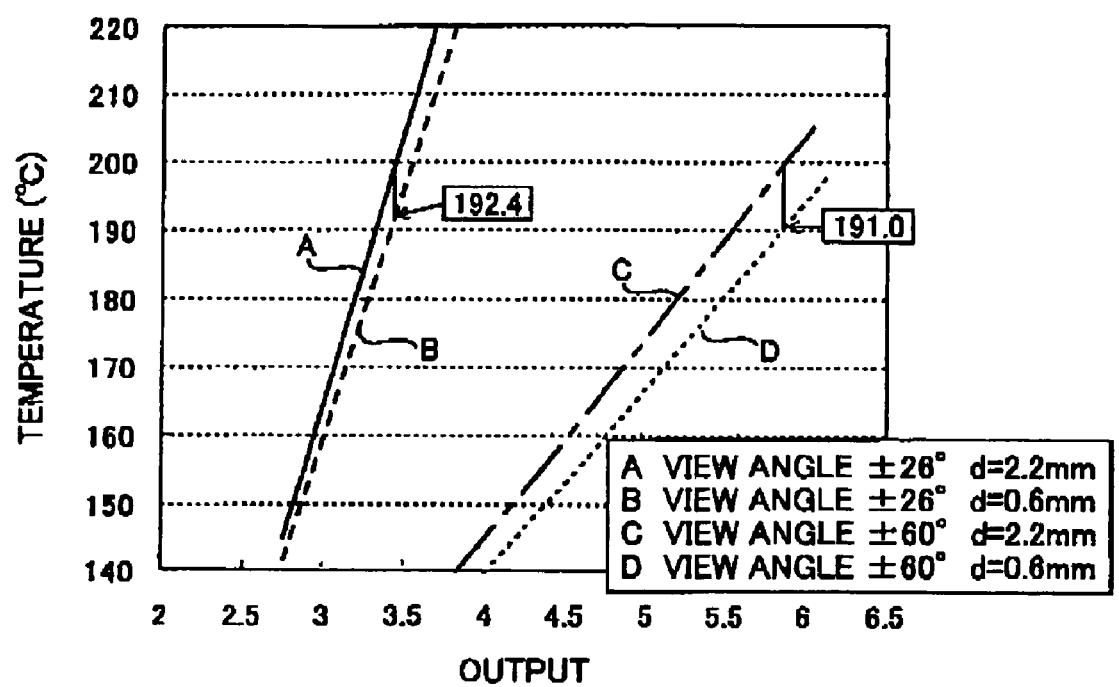
FIG. 21 is a graph of the relationship between the temperature of the heating roller and the output of the temperature sensor.

FIG. 21 shows four relationships between the temperature of the surface of the heating roller 47 and the output of the thermopile element 75 of the temperature sensor 65. When a conduit 67 has the main body formed of a resin with a cylinder length of 30 mm, and the reflective surface 77 formed by gold-plating. A line shows a viewing angle of ±26° and a gap d of 2.2 mm, B had a viewing angle of ±26° and a gap d of 0.6 mm, C had a viewing angle of ±60° and a gap d of 2.2 mm, and D had a viewing angle of ±60° and a gap d of 0.6 mm.

FIG. 21 shows the output of the thermopile element 75 when the surface temperature of 200° C. is sensed under conditions A (viewing angle of ±26° and a gap d of 2.2 mm) and the output when the surface temperature of 192.4° C. is sensed under conditions B (viewing angle of ±26° and a gap d of 0.6 mm), and that two outputs are the same with the difference in the viewing angle of ±26° being 7.6° C.

Similarly, the output of the thermopile element 75 when the surface temperature of 200° C. is sensed under conditions C (viewing angle of ±60° and a gap d of 2.2 mm) and the output of the thermopile element 75 when the surface temperature of 191.0° C. is sensed under conditions D (viewing angle of ±60° and a gap d of 0.6 mm) are the same, with the temperature difference in the viewing angle of ±60° being 9.0° C.

In general, since a temperature sensor 65 that has a larger viewing angle receives more amount of incident infrared rays rather than a temperature sensor 65 that has a smaller viewing angle, the temperature sensor 65 with a larger viewing angle has better sensing sensitivity. However, a temperature sensor 65 that has a larger viewing angle generates a greater difference in sensing temperature has a larger sensed temperature difference due to the gap d than a temperature sensor 65 that has a smaller viewing angle. This is because the increased size of the gap d in the temperature sensor 65 that has a larger viewing angle facilitates sense of infrared rays from portions other than the surface of the heating roller 47. For that reason, the temperature sensor 65 that has larger viewing angle has a better sensitivity and requires more strict attachment-accuracy for setting the gap d. If the attachment accuracy cannot be achieved strictly it is more suitable to use the temperature sensor 65 that has a smaller viewing angle.

Since the laser printer 1 is provided with the heat fixing device which is designed to have an improved durability of the temperature sensor 65 and achieve accurate temperature sensing, the laser printer 1 can exhibit favorable image formation over a long period of time.

The description now turns to a control device and a temperature calculation method for controlling the turning on and off of the heater and controlling the temperature of the heater to an optimal value for fixing a toner image on the paper 5. This control device and temperature calculation method can be applied to any of the above-described embodiments 1 to 7.

First, if an infrared sensor such as a thermopile type of temperature sensor is used as the temperature sensor, any change in humidity within the heat fixing device changes the detected result of the surface temperature of the heating roller, even if the actual surface temperature of the heating roller is the same. This is because water vapor has the property of absorbing infrared rays of a specific wavelength. Since the moisture within the paper evaporates when the sheet is heated in order to fuse the toner, warming the paper, the humidity within the heat fixing device varies substantially depending on the operating state of the laser printer. The humidity within the heat fixing device is also changed by external humidity.

To ensure that the thermopile type of temperature sensor is not affected by humidity within the heat fixing device, a filter is attached in order to cut infrared rays in the wavelength range in which water vapor is readily absorbed, as mentioned previously. The thermopile in the sensor receives only infrared rays in the wavelength range at which water vapor is not easily absorbed, and the surface temperature of the heating roller is calculated based on that voltage level of the thermopile.

Figure 25:
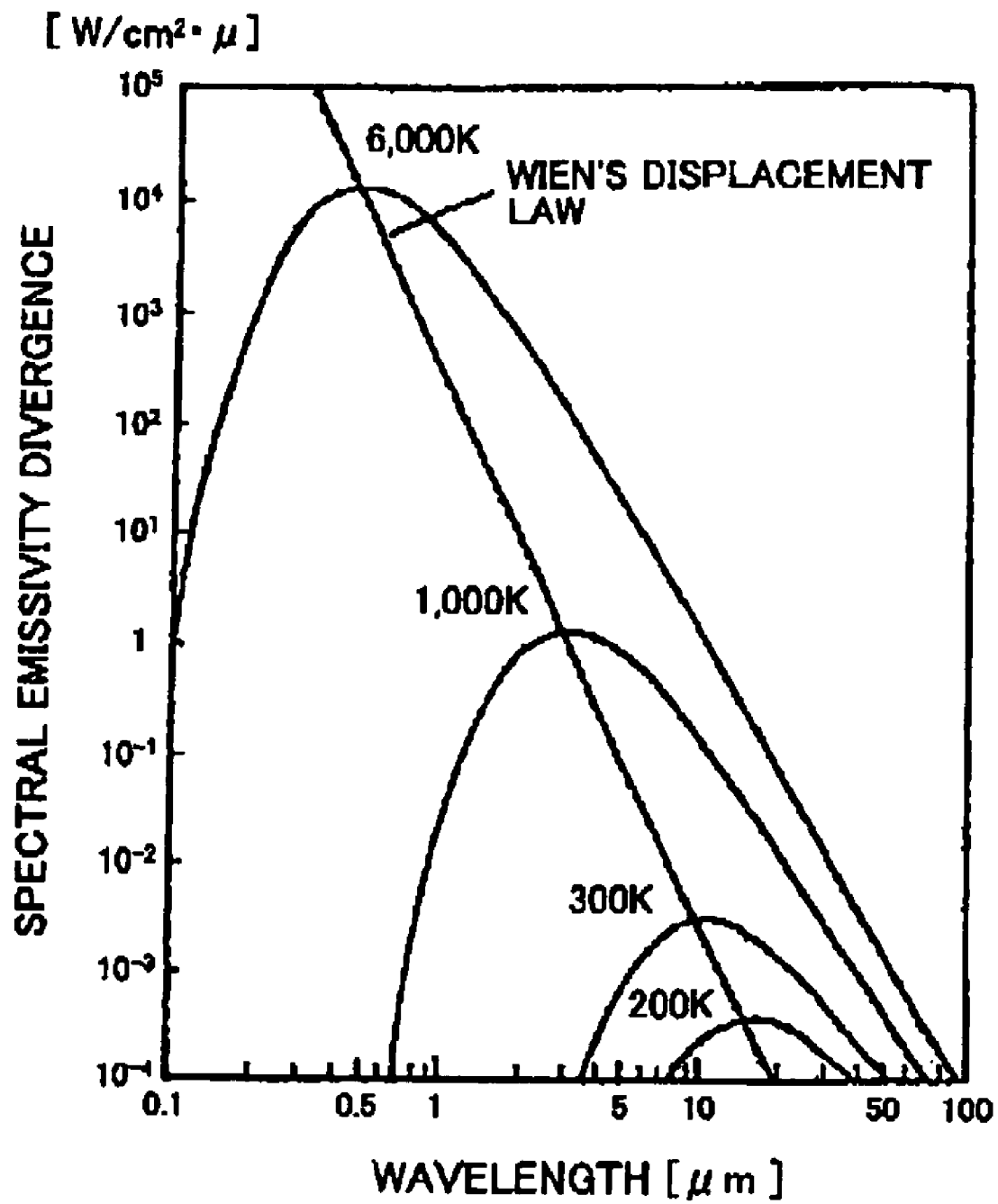
FIG. 25 is a graph of the relationship between blackbody radiation energy and wavelength.

The Stefan-Boltzmann law is expressed as shown in the equation below in view of the relationship between blackbody radiation energy and wavelength, with the results of calculations of the relationship between the black body radiation energy and the wavelength being as shown in FIG. 25.

$$W = \int W_\lambda d\lambda = \eta \alpha T^4$$

(for λ from zero to infinity)
α: Stefan-Boltzmann constant
η: blackbody emissivity As is clear from the above equation, the energy W radiating from a blackbody is obtained by a definite integral over all wavelengths (from zero to infinity) of the radiation energy W for each wavelength of radiation radiating from the blackbody. The blackbody temperature T is derived from the obtained radiating energy. The voltage level P of the thermopile is proportional to the radiation energy W of the heating roller. Therefore, the infrared rays of all wavelengths radiating from the heating roller are received by the thermopile, it is possible to detect the surface temperature of the heating roller from the thus-received infrared rays.

However, the radiation energy $W_\lambda$ for each wavelength has a different distribution depending on the temperature, as shown in FIG. 25. The peak of the distribution as a function of the temperature causes changes so called Wien's displacement law. If a filter is used to interrupt infrared rays of some wavelengths as mentioned previously, the radiation energy W of the thus-cut wavelengths is not proportional to the voltage level P, thereby causing errors in the calculated temperature of the heating roller.

In such a case, the relationship between the surface temperature T of the heating roller and the voltage level P of the electrical signal that is output from the thermopile element is known from the Stefan-Boltzmann law, as in Equation (4) below:

$$P = k\{\epsilon T^4 - T_0^4\} \quad (4)$$

where: inherent constant of the thermopile element; k
temperature of the thermopile element: $T_0$
emissivity of infrared rays by heating roller: $\epsilon$ If the voltage level P is measured in practice, it is clear from experiments that the values of $\epsilon T^4 - T_0^4$ are plotted along a linear line expressed by $k_1 \cdot P + k_2$, using the specific constants $k_1$ and $k_2$ of the thermopile element and the output P of the infrared sensor. The surface temperature T of the heating roller is therefore given by Equation (5):

$$T = \{(k_1 \cdot P + k_2 + T_0^4)/\epsilon\}^{1/4} \quad (5)$$

Note that $k_1$ and $k_2$ in Equation (5) are constants that are inherent in the thermopile element 75 and $\epsilon$ is an inherent constant that indicates the emissivity of infrared rays of the heating roller 47. These values are obtained beforehand by experimentation and are substituted to the equation (5) in beforehand.

Figure 23:
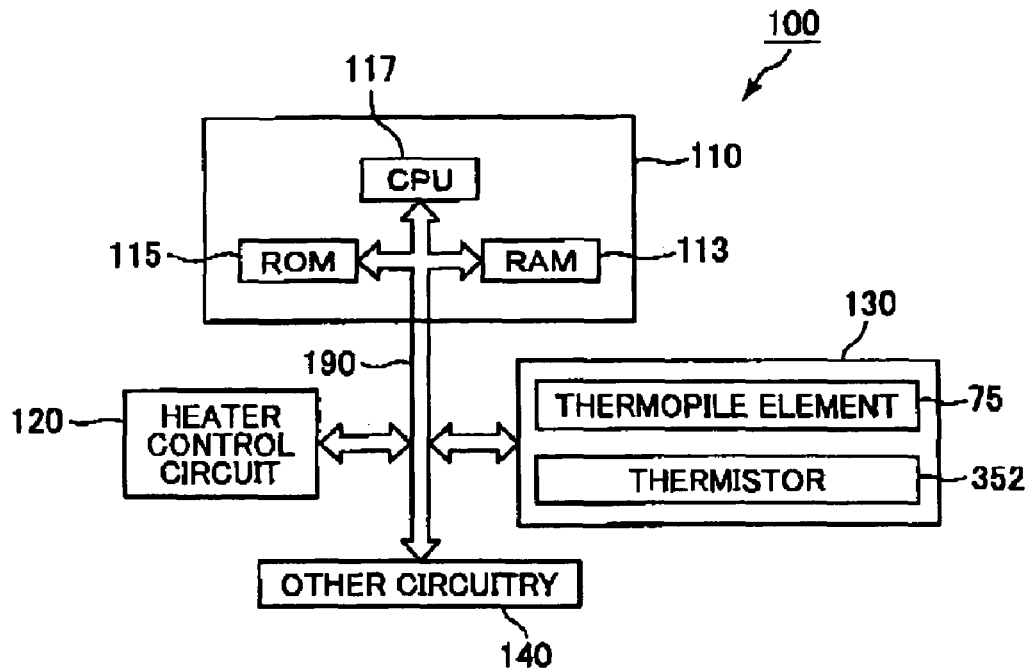
FIG. 23 is a block diagram of the configuration of the control device.

FIG. 23 is a block diagram of a control device 100.

The control device 100 has a central control circuit 110, a heater control circuit 120, a sensor control circuit 130 for detecting the sensor temperature, and other circuitry 140. The circuits 110 to 140 are connected together through a bus 190, as shown in FIG. 23.

The central control circuit 110 includes a CPU 117, a RAM 113, and a ROM 115, and executes various kinds of control. Information relating to the voltage level of an electrical signal that is output from the thermopile element 75 is stored temporarily in the RAM 113. Programs such as a calculation program for calculating the surface temperature of the heating roller and a main control program are stored in the ROM 115.

The halogen lamp 59 is connected to the heater control circuit 120. The turning on and off of the halogen lamp 59 is controlled by a main drive control program stored in the ROM 115.

The temperature sensor 65 is connected to the sensor control circuit 130. When the thermopile element 75 provided for the temperature sensor 65 receives infrared rays, the thermopile element 75 outputs an electrical signal having a voltage level corresponding to the thus-received radiation intensity. The sensor control circuit 130 converts the analog electrical signal into a digital signal and outputs the digital signal to the RAM 113 through the bus 190. The RAM 113 then stores information relating to the voltage level of the electrical signal that was output from the thermopile element 75. When the thermistor 352 provided in the temperature sensor 65 detects the temperature of the thermopile element 75, the resistance of the thermistor 352 changes in accordance with that temperature, so that an electrical signal of a voltage corresponding to that temperature is output from the thermistor 352. The sensor control circuit 130 converts the resultant analog signal into a digital signal, and outputs the digital signal to the RAM 113 through the bus 190. The RAM 113 then stores the voltage level of the electrical signal that was output from the thermistor 352.

When the information relating to the voltage levels of the electrical signals output from the thermopile element 75 and the thermistor 352 are stored in the RAM 113, the central control circuit 110 first executes processing to calculate the temperature of the thermopile element 75 from the voltage level of the electrical signal that was output from the thermistor 352. Since the above processing is known in the art, so that details thereof are omitted.

The central control circuit 110 then executes processing by the calculation program to calculate the temperature T of the surface of the heating roller 47, based on the equation given later.

The calculation program substitutes the voltage level p of the electrical signal that is output from the thermopile element 75 and the temperature $T_0$ of the thermopile element 75 obtained from the voltage level P' of the electrical signal output from the thermistor 352 into the above Equation (5) to calculate the temperature T of the surface of the heating roller 47, and stores the calculated temperature T in the RAM 113. Note that the processing for executing this calculation program by the central control circuit 110 is equivalent to the temperature sensing means of the present invention.

When the temperature T of the surface of the heating roller 47 is stored in the RAM 113 by the calculation program, the main drive control program controls the turning on and off of the heater through the heater control circuit 120 to control the temperature of the surface of the heating roller 47 to the optimum temperature for fixing the toner image on the paper 5.

The laser printer 1 described above can calculate the temperature of the surface of the heating roller 47 accurately, based on the result of detecting the infrared rays radiating from the heating roller 47 by the non-contact type of thermopile element 75.

The description now concerns the values of $k_1$ and $k_2$ obtained as constants used in Equation (5), when the heating roller 47 having infrared ray emissivity $\epsilon=0.5$, in which the surface of the pure aluminum tube is laminated and fired with primer and PFA, is used, and the temperature sensor 65: model of product IRTE5021TC01 available from Murata Manufacturing is used.

Figure 24:
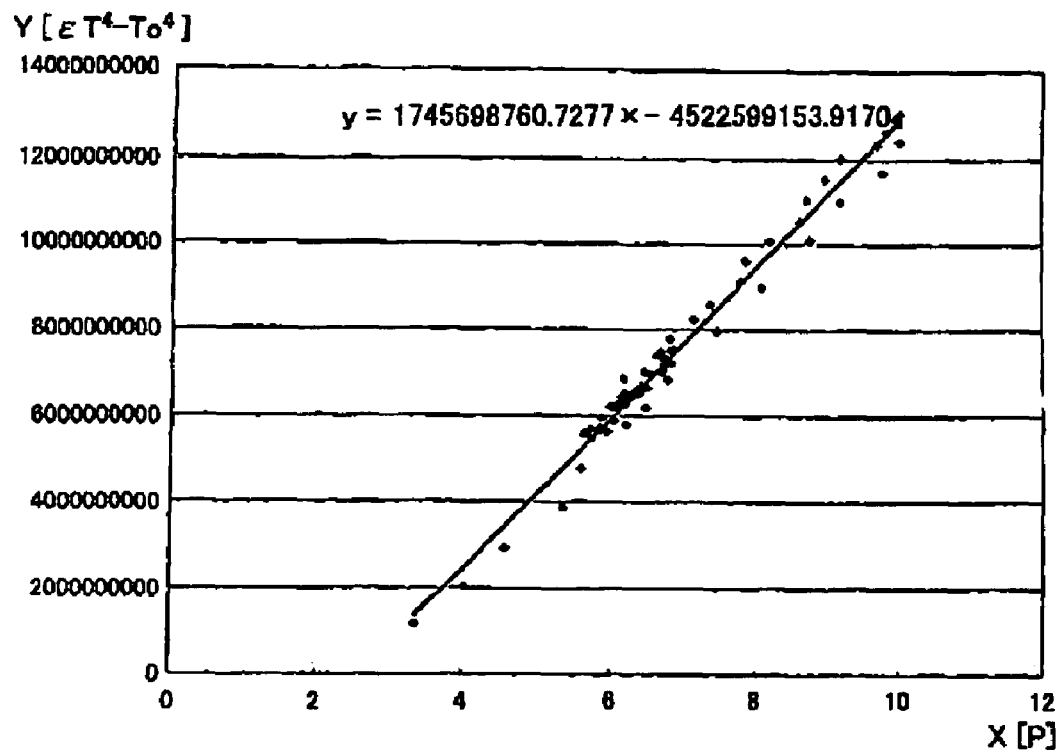
FIG. 24 is a graph of the relationship between the voltage level P of the thermopile element and $\epsilon T^4 - T_0^4$, with the voltage level P of the thermopile element plotted along the horizontal axis and $\epsilon T^4 - T_0^4$ plotted along the vertical axis.

FIG. 24 shows a graph in which the horizontal axis shows a voltage level of the thermopile element amplified 100 times by an op-amp and the vertical axis shows the value of $(\epsilon T^4 - T_0^4)$.

To obtain $k_1$ and $k_2$, a thermistor is first installed on the surface of the heating roller 47 to measure the actual surface temperature of the heating roller 47. The halogen lamp 59 is then turned on to increase the temperature of the heating roller 47. At this time, the temperature T of the surface of the heating roller 47, the voltage level P of the thermopile element 75, and the temperature $T_0$ detected by the thermistor 352 installed within the temperature sensor 65 are measured to plot values of $(\epsilon T^4 - T_0^4)$ corresponding to the output level P of the thermopile element 75, as shown in FIG. 24. It is clear from FIG. 24 that these values lie along a line $k_1 \cdot P + k_2$.

Therefore, $$k_1 \cdot P + k_2 = \epsilon T^4 - T_0^4 \qquad (6)$$

The above Equation (5) is derived from the Equation (6).

Note that in FIG. 24 $k_1$ is 1745698760.7277 and $k_2$ is −4522599153.9170.

Note that the present invention is not limited to the above-described embodiments and various modifications and improvements are within the scope of the invention.

In the above embodiments, the voltage level P of the electrical signal output from the thermopile element 75 and the detected temperature $T_0$ of the thermistor 352 are used in connection with the Equation (5) to perform the calculations. In the present invention, a table of the relationships of the voltage level P' of the thermopile element 75, the detected temperature $T_0$ of the thermistor 352, and the temperature T of the surface of the heating roller 47 is provided. By using the table, the detected temperature T of the heating roller 47 is read out from the voltage level P of the thermopile element 75 and the detected temperature $T_0$ of the thermistor 352. Thus, the surface temperature T can be simply read out from the table, based on the voltage level P of the thermopile element 75 and the temperature $T_0$ of the temperature sensor 650 detected by the thermistor 352. Accordingly, it is possible to reduce the load on the central control device 110 for calculating the temperature T of the surface of the heating roller 47. The table can be stored in the ROM 115. The storage location of the table is not limited.

In the above embodiments, the heating roller 47 incorporating the halogen lamp 59 is used as the heat fixing device 33. A heat fixing device using an induction heating method can be used. In the induction heating, electromagnets are disposed on the end surfaces of the heating roller in the axial direction thereof, and the heating roller is heated by a magnetic field generated by the electromagnets.

In the above embodiments, a thermopile type of temperature sensor 65 is used as the infrared sensor. Any type of infrared sensor other than a thermopile type of temperature sensor can be used.

In the above embodiments, the removal claws 34 are used as contacting members. The contacting members are not limited to the removal claws 34. A contact type of auxiliary temperature sensor can be placed in contact with the heating roller 47, by way of example. In this case, the contacting member and the temperature sensor 65 are placed in the axial direction of the heating roller 47 not to overlap each other, as described previously.

In the above embodiments, the surface of the heating roller 47 of the heat fixing device 33 is sensed by the temperature sensor 65. Instead of sensing the temperature of the heating roller 47, the temperature of the surface of the press roller 49 can be sensed because of the high correlation with the temperature of the surface of the heating roller 47.

In the above embodiments, the heating roller 47 and the press roller 49 are used as the fixing means. Alternatively, a belt-shaped fixing means can be used in the present invention. A belt-shaped heating member and a roller-shaped pressure member, a roller-shaped heating member and a belt-shaped pressure member, or a belt-shaped heating member and a belt-shaped pressure member can be used as the fixing means.

In addition, the sectional shape of the cylindrical conduit 67 in the direction orthogonal to the axial direction is not limited to a particular shape. Thus the conduit 67 can have any sectional shape orthogonal to the axial direction such as square. The sectional shape of the conduit 67 in the axial direction can be formed as a tapered shape.

In the above embodiments, the heat fixing device in accordance with the present invention has been described as the heat fixing device 33 of the laser printer 1. The present invention is not limited to the fixing device described above. A laminator for heating and fixing a medium to be fixed to form a film can be used as the heat fixing device.

As described above, the heat fixing device in accordance with the present invention is used in a laser printer that is provided with a heat fixing device including a heating roller, a press roller, and a non-contact type of temperature sensor; or a laminator in which film is fixed by heat.

The invention claimed is:

1. A heat fixing device comprising:
a fixing member that generates heat;
an accommodation member that substantially surrounds only the fixing member;
a temperature sensor including a temperature detecting element at least partially disposed outside the accommodation member, the temperature detecting element being configured to detect infrared rays radiating from the surface of the fixing member;
a ray-guiding member interposed between the temperature sensor and the fixing member and including a hollow portion and a reflective surface provided facing the hollow portion in order to reflect the infrared rays, the ray-guiding member being configured to guide the infrared rays radiating from the fixing member to the temperature sensor, a portion of the temperature sensor being within the hollow portion of the ray-guiding member; and
a thermal conductivity resistance member provided between the reflective surface of the ray-guiding member and the temperature sensor.

2. The heat fixing device as defined by claim 1, wherein the reflective surface is formed from a metal.

3. The heat fixing device as defined by claim 2, wherein the reflective surface is formed from gold.

4. The heat fixing device as defined by claim 1, wherein a whole of the ray-guiding member is formed from a metal.

5. The heat fixing device as defined by claim 4, wherein the surface and the ray-guiding member are placed at a distance at least 20 mm from each other.

6. The heat fixing device as defined by claim 1, wherein the ray-guiding member has a main body formed from a resin and the reflective surface is formed from a metal.

7. The heat fixing device as defined by claim 6, wherein the surface and the temperature sensor are placed at a distance at least 20 mm from each other.

8. The heat fixing device as defined by claim 1, further comprising:
a contacting member in contact with the fixing member; wherein
the temperature sensor is disposed in such a manner as not to overlap the contacting member in a direction orthogonal to the direction in which a fixing medium is fed.

9. The heat fixing device as defined by claim 1, wherein:
the fixing member includes a heating member to be heated and a press member that presses the heating member; and
the temperature sensor senses the temperature of the surface of the heating member.

10. The heat fixing device as defined by claim 1, wherein the surface roughness of the reflective surface is less than or equal to a wavelength sensed by the temperature sensor.

11. The heat fixing device as defined by claim 1, wherein the reflective surface includes a mirrored surface.

12. The heat fixing device as defined by claim 1, wherein the thermal conductivity resistance portion is formed from a thermal insulating material.

13. The heat fixing device as defined by claim 12, wherein the thermal insulating material has a thermal conductivity of 10 W/mK or less.

14. The heat fixing device as defined by claim 12, wherein the thermal insulating material includes a heat-resistant resin.

15. The heat fixing device as defined by claim 12, wherein a portion formed of an insulating material has a length of at least 0.1 mm along the thermal conduction path.

16. The heat fixing device as defined by claim 1, wherein the thermal conductivity resistance portion is separated by air in the thermal conduction path.

17. The heat fixing device as defined by claim 16, wherein a portion separated by air has a length of at least 0.1 mm along the thermal conduction path.

18. The heat fixing device as defined by claim 1, wherein the thermal conductivity resistance portion has a sectional area of a surface perpendicular to a thermal conduction direction that is smaller than a sectional areas of vicinity of the surface in the thermal conduction path.

19. The heat fixing device as defined by claim 1, wherein the thermal conductivity resistance portion is provided between the ray-guiding member and the temperature sensor.

20. The heat fixing device as defined by claim 1, wherein the thermal conductivity resistance portion is provided in the ray-guiding member.

21. The heat fixing device as defined by claim 20, wherein the thermal conductivity resistance portion is formed by forming a main body of the ray-guiding member from a thermal insulating material.

22. The heat fixing device as defined by claim 1, wherein the thermal conductivity resistance portion is provided in a casing of the temperature sensor.

23. The heat fixing device as defined by claim 1, further comprising a radiation member for removing heat from the ray-guiding member and/or the temperature sensor.

24. The heat fixing device as defined by claim 23, wherein the radiation member is in contact with the ray-guiding member and/or the temperature sensor, the radiation member is provided with radiation fins.

25. The heat fixing device as defined by claim 23, wherein the radiation member is in contact with the ray-guiding member and/or the temperature sensor, and the radiation member is in contact with another member which is at a lower temperature than that of the ray-guiding member and/or the temperature sensor.

26. The heat fixing device as defined by claim 1, wherein the ray-guiding member is fixed to a support member that supports the fixing member.

27. The heat fixing device as defined by claim 26, wherein the temperature sensor is separable from the ray-guiding member 28. The heat fixing device as defined by claim 27, wherein the temperature sensor is attached to the accommodation member.

29. The heat fixing device as defined by claim 1, wherein the ray-guiding member is positioned with reference to a support member that supports the fixing member.

30. The heat fixing device as defined by claim 1, wherein the temperature detecting element comprises a thermopile-type element to detect infrared rays.

31. The heat fixing device as defined by claim 30, wherein a casing of the thermopile-type element is formed from a thermal insulation member.

32. The heat fixing device as defined by claim 1, wherein the fixing member includes a roller.

33. An image forming apparatus provided with the heat fixing device as claimed by claim 1.

34. A laminator provided with the heat fixing device as defined by claim 1.

35. A heat fixing device comprising:
a fixing member that generates heat;
a temperature sensor that measures a surface temperature of the fixing member based on infrared rays radiating from a surface of the fixing member;
a ray-guiding member that guides infrared rays radiating from the fixing member to the temperature sensor; and
a thermal conductivity resistance portion that interrupts thermal conduction of heat generated by the fixing member along a thermal conduction path to the temperature sensor through the ray-guiding member.

36. The heat fixing device as defined by claim 35, wherein the temperature sensor includes a thermopile type of infrared sensor.

37. The heat fixing device as defined by claim 35, wherein the fixing member includes a roller.

38. The heat fixing device as defined by claim 37, wherein the roller, the ray-guiding member, and the temperature sensor are positioned so as to satisfy the following equation (1):

$$0 < d \leq r\{(1/\sin\theta) - 1\} - r'/\tan\theta \quad (1)$$

wherein the diameter of the roller is set as 2 r, an internal length of an aperture portion of the ray-guiding member in a direction orthogonal to both the axial direction of the roller and a longitudinal direction of the ray-guiding member is set as 2 r', a gap between the surface and the ray-guiding member is set as d, and a viewing angle of the temperature sensor is set as $\theta$.

39. An image forming apparatus comprising the heat fixing device as defined by claim 35.

40. A laminator comprising the heat fixing device as defined by claim 1.

41. The heat fixing device as defined by claim 35, further comprising an accommodation member that accommodates the fixing member.

* * * * *